US012800409B2

(12) United States Patent
Kinjo

(10) Patent No.: US 12,800,409 B2
(45) Date of Patent: Nov. 17, 2026

(54) FORCE DISTRIBUTION SENSOR

(71) Applicant: Japan Display Inc., Tokyo (JP)

(72) Inventor: Hiroumi Kinjo, Tokyo (JP)

(73) Assignee: Japan Display Inc., Tokyo (JP)

( * ) Notice: Subject to any disclaimer, the term of this patent is extended or adjusted under 35 U.S.C. 154(b) by 317 days.

(21) Appl. No.: 18/588,510

(22) Filed: Feb. 27, 2024

(65) Prior Publication Data

US 2024/0295449 A1 Sep. 5, 2024

(30) Foreign Application Priority Data

Mar. 1, 2023 (JP) ................................ 2023-031181

(51) Int. Cl.
*G01L 1/20* (2006.01)
*G01L 1/14* (2006.01)

(52) U.S. Cl.
CPC .............. *G01L 1/146* (2013.01); *G01L 1/205* (2013.01)

(58) Field of Classification Search
CPC . G01L 1/146; G01L 1/205; G01L 1/20; G01L 1/00; G01L 1/005
USPC ............... 73/862.04, 862.862, 625, 862.627, 73/862.628, 862.68
See application file for complete search history.

(56) References Cited

U.S. PATENT DOCUMENTS

2022/0082457 A1 3/2022 Kinjo

FOREIGN PATENT DOCUMENTS

| | | | | | | |
|---|---|---|---|---|---|---|
| AU | 2015100011 | A4 | * | 2/2015 | ............. | G01L 1/205 |
| CN | 105934733 | A | * | 9/2016 | ............. | G06F 3/046 |
| CN | 111562038 | A | * | 8/2020 | ............. | G01L 1/146 |
| CN | 115144106 | A | * | 10/2022 | .............. | C08J 9/122 |
| JP | 2022-049511 | A | | 3/2022 | | |

* cited by examiner

*Primary Examiner* — Robert R Raevis
(74) *Attorney, Agent, or Firm* — K&L Gates LLP

(57) ABSTRACT

A force distribution sensor includes an array substrate, a sensor sheet, and a protective sheet that are stacked in order on a predetermined installation surface. The array substrate includes a first surface on which the sensor sheet is disposed and that faces in a first direction, and a plurality of array electrodes provided on the first surface.

13 Claims, 17 Drawing Sheets

FORCE DISTRIBUTION SENSOR

CROSS-REFERENCE TO RELATED APPLICATION

This application claims the benefit of priority from Japanese Patent Application No. 2023-031181 filed on Mar. 1, 2023, the entire contents of which are incorporated herein by reference.

BACKGROUND

1. Technical Field

The present disclosure relates to a force distribution sensor.

2. Description of the Related Art

As disclosed in Japanese Patent Application Laid-open Publication No. 2022-49511, a force distribution sensor includes an array substrate provided with a plurality of array electrodes, a sensor layer (also called a pressure sensitive layer) covering the array substrate, and a protective layer covering the sensor layer. A detection region of the force distribution sensor is divided into a plurality of individual detection regions corresponding to the array electrodes.

In the force distribution sensor of the above-described patent literature, the sensor layer is fixed to the array substrate by a bonding agent. The array substrate would be damaged if the sensor layer is separated from the array substrate. Thus, it is impossible to replace the sensor layer only, for example, in a case where the sensor layer has degraded.

The present disclosure is intended to provide a force distribution sensor in which a sensor layer is replaceable without damage on an array substrate.

SUMMARY

A force distribution sensor according to a first embodiment of the present disclosure includes an array substrate, a sensor sheet, and a protective sheet that are stacked in order on a predetermined installation surface. The array substrate includes a first surface on which the sensor sheet is disposed and that faces in a first direction, and a plurality of array electrodes provided on the first surface, the sensor sheet includes a sensor base material having a second surface facing in a second direction opposite the first direction, and a sensor layer provided on the second surface and opposite the array electrode, the protective sheet includes a protective base material, and a bonding layer provided on a surface of the protective base material, the surface facing in the second direction, and the protective sheet includes a first region bonded to the sensor base material and overlapping the sensor sheet when viewed in the second direction, and a second region bonded to the installation surface and positioned outside an edge part of the sensor sheet when viewed in the second direction.

A force distribution sensor according to a second embodiment of the present disclosure includes an array substrate and a sensor sheet that are stacked in order on a predetermined installation surface, and a fixation component fixed to the installation surface. The array substrate includes a first surface on which the sensor sheet is disposed and that faces in a first direction, and a plurality of array electrodes provided on the first surface, the sensor sheet includes a sensor base material having a second surface facing in a second direction opposite the first direction, and a sensor layer provided on the second surface and opposite the array electrode, the sensor sheet includes an opposite region overlapping the array substrate when viewed in the second direction, and an outside region positioned outside an edge part of the array substrate when viewed in the second direction, and the fixation component detachably fixes the outside region.

A force distribution sensor according to a third embodiment of the present disclosure includes an array substrate and a sensor sheet that are stacked in order on a predetermined installation surface, and a detachable component detachably attached to the installation surface. The array substrate includes a first surface on which the sensor sheet is disposed and that faces in a first direction, and a plurality of array electrodes provided on the first surface, the sensor sheet includes a sensor base material having a second surface facing in a second direction opposite the first direction, and a sensor layer provided on the second surface and opposite the array electrode, the sensor sheet includes an opposite region overlapping the array substrate when viewed in the second direction, and an outside region positioned outside an edge part of the array substrate when viewed in the second direction, and the detachable component integrates the outside region.

DETAILED DESCRIPTION

Aspects (embodiments) of a force distribution sensor of the present disclosure will be described below in detail with reference to the accompanying drawings. Contents described below in the embodiments do not limit the invention of the present disclosure. Constituent components described below include those that could be easily thought of by the skilled person in the art and those identical in effect. Constituent components described below may be combined as appropriate. What is disclosed herein is merely exemplary, and any modification that could be easily thought of by the skilled person in the art as appropriate without departing from the gist of the invention is contained in the scope of the present disclosure. For clearer description, the drawings are schematically illustrated for the width, thickness, shape, and the like of each component as compared to an actual aspect in some cases, but the drawings are merely exemplary and do not limit interpretation of the present disclosure. In the present specification and the drawings, any constituent component same as that already described with reference to an already described drawing is denoted by the same reference sign, and detailed description thereof is omitted as appropriate in some cases.

In the present specification and the claims, an expression with "on" in description of an aspect in which one structural body is disposed on another structural body includes both a case in which the one structural body is directly disposed on the other structural body in contact and a case in which the one structural body is disposed above the other structural body with still another structural body interposed therebetween, unless otherwise stated in particular.

First Embodiment

Figure 1:
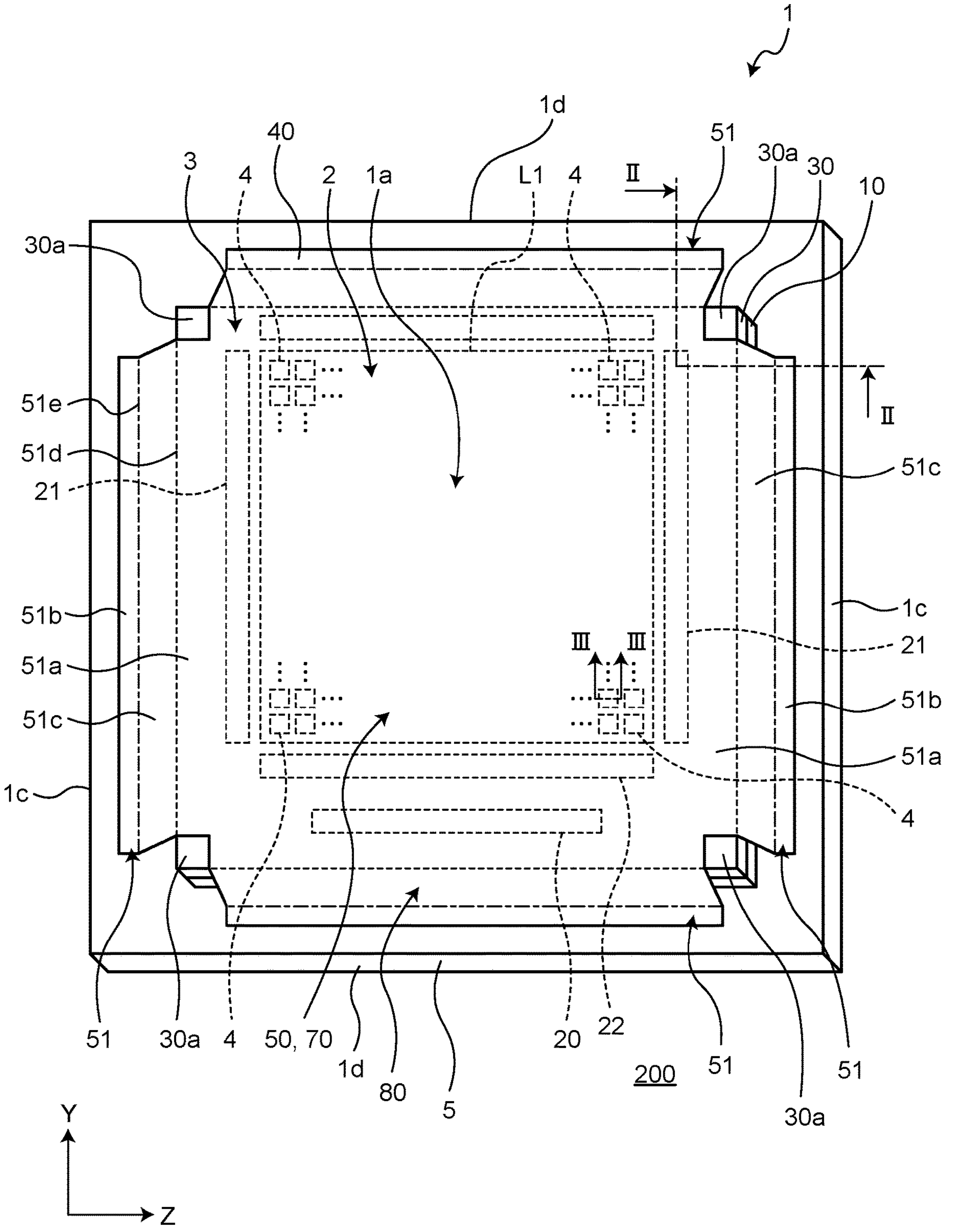
FIG. 1 is a perspective view schematically illustrating a force distribution sensor of a first embodiment.

FIG. 1 is a perspective view schematically illustrating a force distribution sensor of a first embodiment. As illustrated in FIG. 1, this force distribution sensor 1 has a plate shape. One surface of the force distribution sensor 1 is an input surface 1*a* to which force is input. The force distribution sensor 1 has a square shape (rectangular shape) when viewed in a direction orthogonal to the input surface 1*a*. Accordingly, the force distribution sensor 1 has a pair of longitudinal side surfaces 1*c* and 1*c* and a pair of lateral side surfaces 1*d* and 1*d*. Hereinafter, a direction in which the longitudinal side surface 1*c* extends is referred to as a first planar direction Y. In addition, a direction in which the lateral side surface 1*d* extends is referred to as a second planar direction Z. The first planar direction Y and the second planar direction Z are orthogonal to each other.

The input surface 1*a* is divided into a detection region 2 capable of detecting force and a peripheral region 3 surrounding outside the detection region 2. In FIG. 1, a boundary line L1 is illustrated to facilitate recognition of the boundary between the detection region 2 and the peripheral region 3. The detection region 2 is divided into a plurality of individual detection regions 4. In other words, the detection region 2 is a set of the individual detection regions 4. The individual detection regions 4 are arrayed in the first planar direction Y and the second planar direction Z and disposed in a matrix having a row-column configuration.

Figure 2:
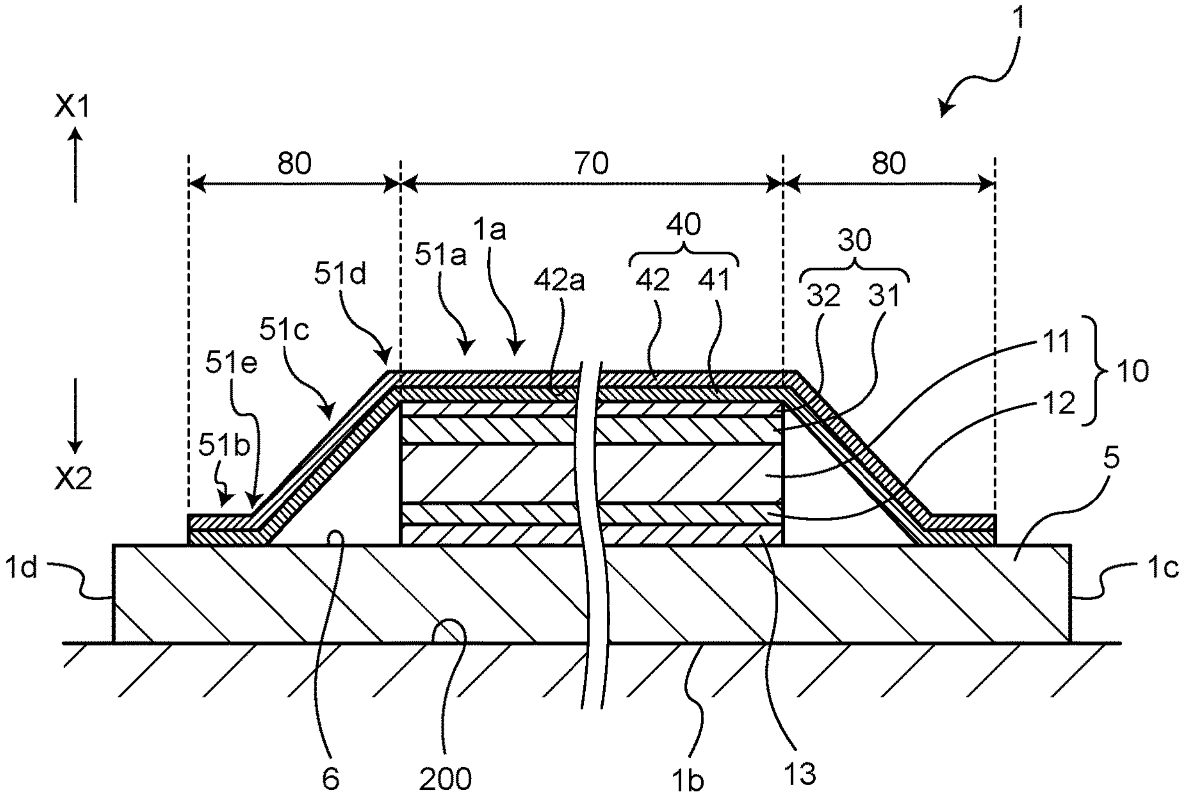
FIG. 2 is a sectional view taken along line II-II in FIG. 1 when viewed in the direction of arrows.

FIG. 2 is a sectional view taken along line II-II in FIG. 1 when viewed in the direction of arrows. As illustrated in FIG. 2, the back surface of the input surface 1*a* of the force distribution sensor 1 is a bottom surface 1*b* that contacts a plane 200 such as a road surface or a floor surface. In the present embodiment, the bottom surface 1*b* of the force distribution sensor 1 is not particularly fixed to the plane 200. Accordingly, the force distribution sensor 1 is movable. The force distribution sensor 1 may be used while being fixed to the plane 200, and the present disclosure is not particularly limited thereto. Hereinafter, a direction in which the input surface 1*a* faces is referred to as a first direction X1, and a direction in which the bottom surface 1*b* faces is referred to as a second direction X2. A view in the second direction X2 is also referred to as plan view in some cases.

As illustrated in FIG. 2, the force distribution sensor 1 includes a support substrate 5, an array substrate 10, a sensor sheet 30, and a protective sheet 40 that are disposed in order in the first direction X1 on the plane 200. The support substrate 5 is a plate member having high stiffness and is unlikely to deform. A surface of the support substrate 5 in the first direction X1 is an installation surface 6 on which the array substrate 10 is installed. A surface of the support substrate 5 in the second direction X2 is the bottom surface 1*b*.

As illustrated in FIG. 1, the array substrate 10 has a square shape (rectangular shape) smaller than the support substrate 5 in plan view. The array substrate 10 is disposed at a central part of the installation surface 6 of the support substrate 5. Accordingly, a central part of the array substrate 10 overlaps the detection region 2. An end part (frame part) of the array substrate 10 other than the central part overlaps the peripheral region 3 in plan view.

As illustrated in FIG. 2, the array substrate 10 includes an array layer 11 and an array base material 12 on which the array layer 11 is provided. The array layer 11 is integrated with the array base material 12. The array base material 12 is disposed in the first direction X1 relative to the array layer 11. An array substrate bonding layer 13 is provided between the array substrate 10 and the support substrate 5. Accordingly, the array substrate 10 is fixed to the installation surface 6.

Figure 3:
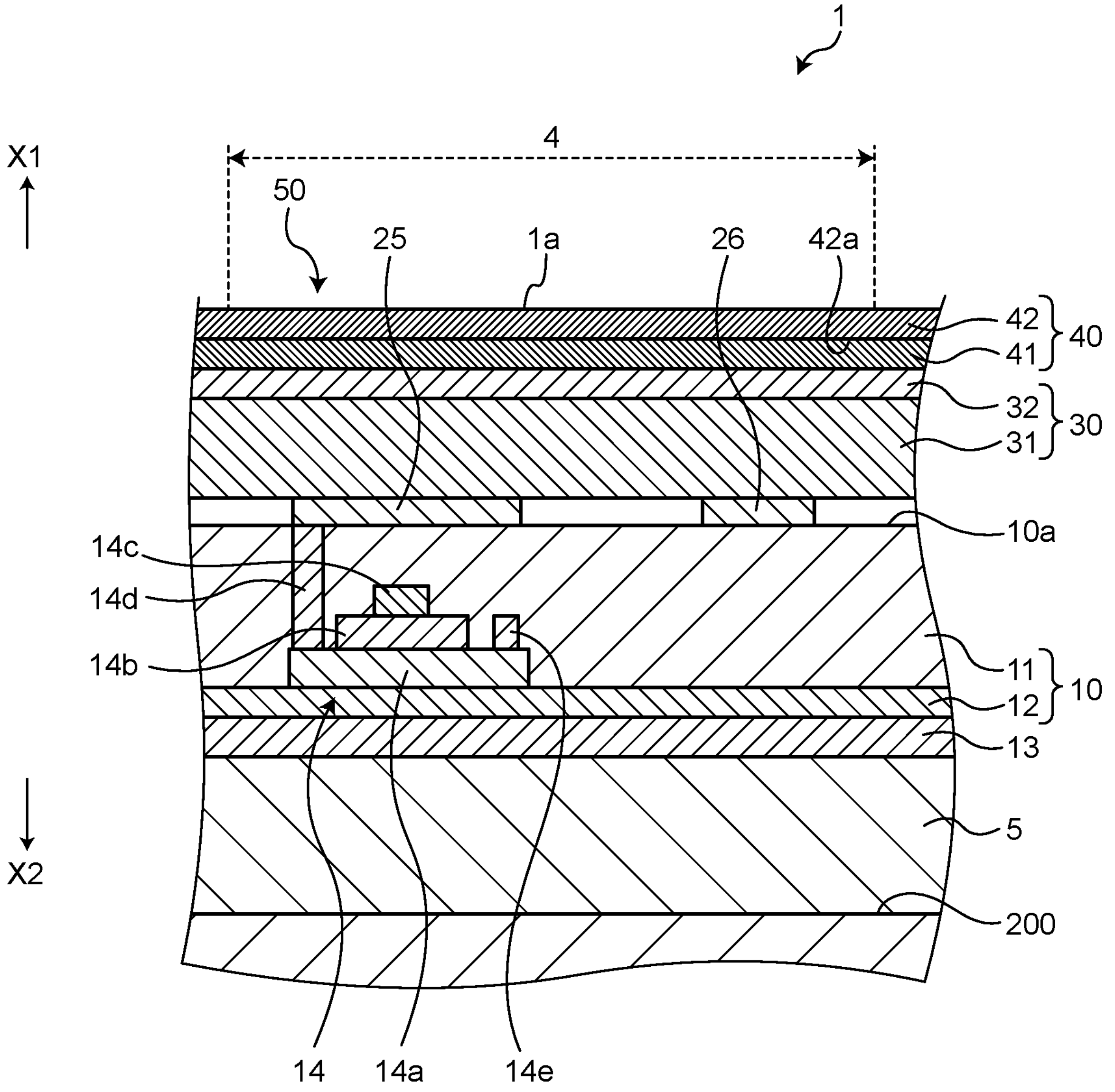
FIG. 3 is a sectional view taken along line III-III in FIG. 1 when viewed in the direction of arrows.

FIG. 3 is a sectional view taken along line III-III in FIG. 1 when viewed in the direction of arrows. As illustrated in FIG. 3, a plurality of transistors 14, a plurality of array electrodes 25, and a plurality of common electrodes 26 are provided at part of the array layer 11, which is disposed in the detection region 2. One transistor 14, one array electrode 25, and one common electrode 26 are provided in each individual detection region 4. The array layer 11 includes, as components for driving the transistors 14, a coupling part 20 (refer to FIG. 1), gate line drive circuits 21 (refer to FIG. 1), signal line selection circuits 22 (refer to FIG. 1), gate lines 23 (refer to FIG. 5), and signal lines 24 (refer to FIG. 5).

As illustrated in FIG. 3, each transistor 14 includes a semiconductor layer 14*a*, a gate insulating film 14*b*, a gate electrode 14*c*, a source electrode 14*d*, and a drain electrode 14*e*. The source electrode 14*d* is electrically coupled to an array electrode 25. The gate electrode 14*c* is coupled to the gate line 23. The drain electrode 14*e* is coupled to the signal line 24.

The array electrodes 25 and the common electrodes 26 are manufactured of a metallic material such as indium tin oxide (ITO). A first surface 10*a* of the array substrate 10, which faces in the first direction X1 is flattened by an insulating layer covering the transistors 14 and the like. The array electrodes 25 and the common electrodes 26 are provided on the first surface 10*a* of the array substrate 10 and exposed in the first direction X1. Each common electrode 26 is coupled to a common wire (not illustrated) through a non-illustrated wire. Accordingly, the common electrode 26 is supplied with a constant amount of current from a drive IC.

As illustrated in FIGS. 2 and 3, the sensor sheet 30 includes a sensor layer 31, and a sensor base material 32 on which the sensor layer 31 is provided. The sensor layer 31 is integrated with the sensor base material 32. The sensor layer 31 is disposed in the second direction X2 relative to the sensor base material 32. As illustrated in FIG. 1, the sensor sheet 30 has a square shape (rectangular shape) in plan view. The sensor sheet 30 is as the same size as the array substrate 10.

The sensor sheet 30 is disposed in the first direction X1 relative to the array substrate 10. The sensor layer 31 is stacked on the array substrate 10 in the second direction X2. As illustrated in FIG. 2, part of the sensor layer 31, which is disposed in the peripheral region 3 is in contact with the first surface 10*a* of the array substrate 10. As illustrated in FIG. 3, part of the sensor layer 31, which is disposed in the detection region 2 is in contact with the array electrodes 25 and the common electrodes 26.

The sensor base material 32 is manufactured of, for example, a resin substrate or a resin film and has insulating and flexible properties. The sensor layer 31 is a pressure sensitive layer containing conductive fine particles inside a highly insulating resin layer. The fine particles are dispersed inside the resin layer and separated from one another. Accordingly, when the resin layer is not deformed, the sensor layer 31 has a high resistance value and is not electrically coupled to the array electrodes 25 and the common electrodes 26.

Figure 4:
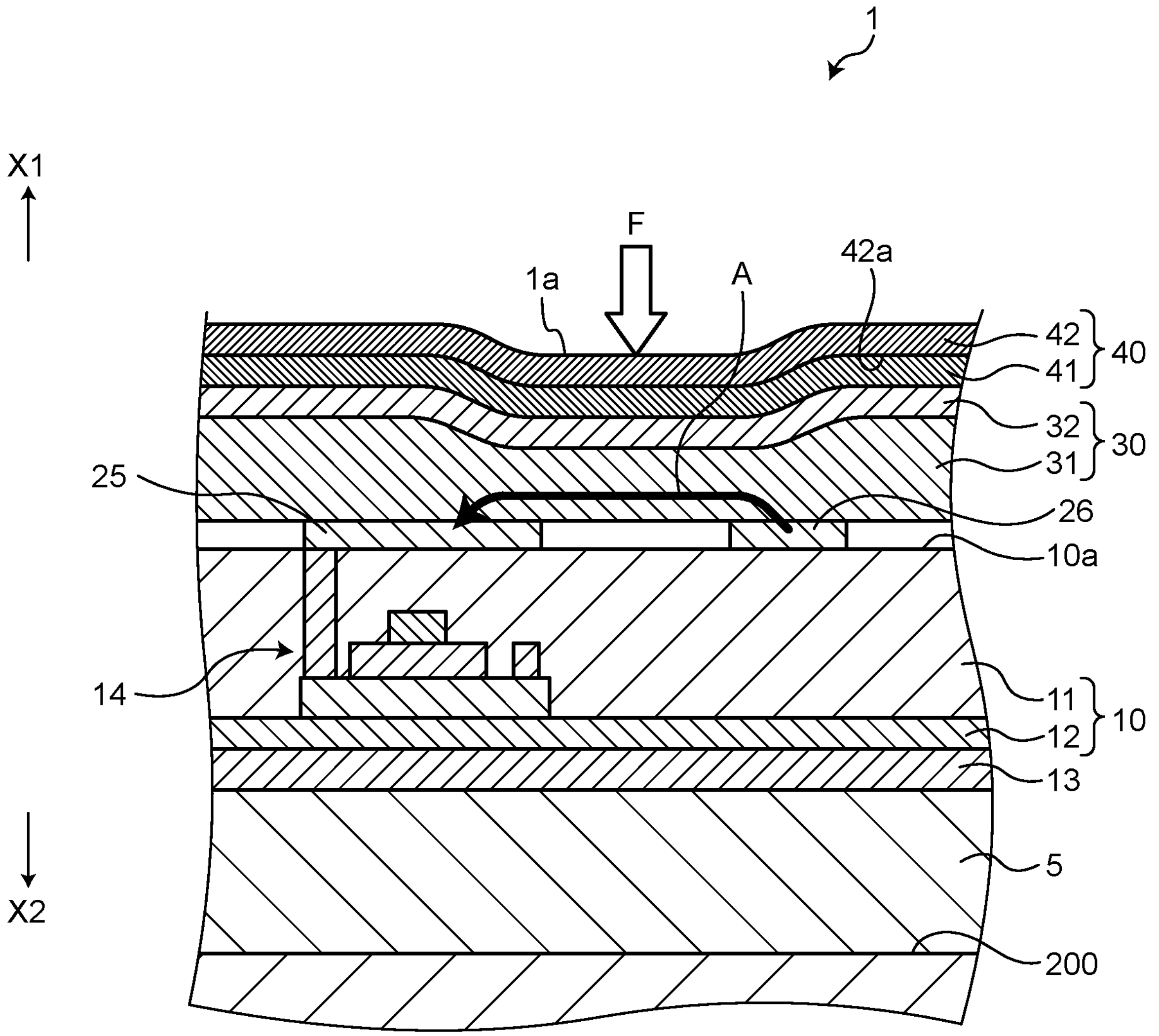
FIG. 4 is a sectional view of a state in which force is input to an input surface.

FIG. 4 is a sectional view of a state in which force is input to the input surface. Meanwhile, as illustrated in FIG. 4, when force F is input to the input surface 1*a* and the resin layer is deformed, the fine particles contact or approach one another and the resistance value of the sensor layer 31 decreases. Accordingly, current flows from the common electrode 26 to the array electrode 25 through the sensor layer 31 (refer to arrow A in FIG. 4). As the deformation amount of the resin layer increases, the number of contacting fine particles increases and the resistance value of the sensor layer 31 largely decreases. Accordingly, a larger amount of current flows to the array electrode 25. As a result, a current value input to the array electrode 25 increases in proportion to the input force.

As illustrated in FIG. 1, the coupling part 20, the gate line drive circuits 21, and the signal line selection circuits 22 are disposed in the peripheral region 3. The coupling part 20 is used to couple to a drive integrated circuit (IC) disposed outside the force distribution sensor 1. The drive IC may be mounted as a chip-on film (COF) on a flexible printed board or a rigid substrate coupled to the coupling part 20. Alternatively, the drive IC may be mounted as a chip-on glass (COG) in the peripheral region 3 of the support substrate 5.

The gate line drive circuits 21 are circuits configured to drive the gate lines 23 (refer to FIG. 5) based on various kinds of control signals from the drive IC. The gate line drive circuits 21 sequentially or simultaneously select a plurality of gate lines 23 and supply a gate drive signal to the selected gate lines 23. The signal line selection circuit 22 is a switch circuit configured to sequentially or simultaneously select a plurality of signal lines 24 (refer to FIG. 3). The signal line selection circuit 22 is, for example, a multiplexer. The signal line selection circuit 22 couples the selected signal lines 24 to the drive IC based on a selection signal supplied from the drive IC.

Figure 5:
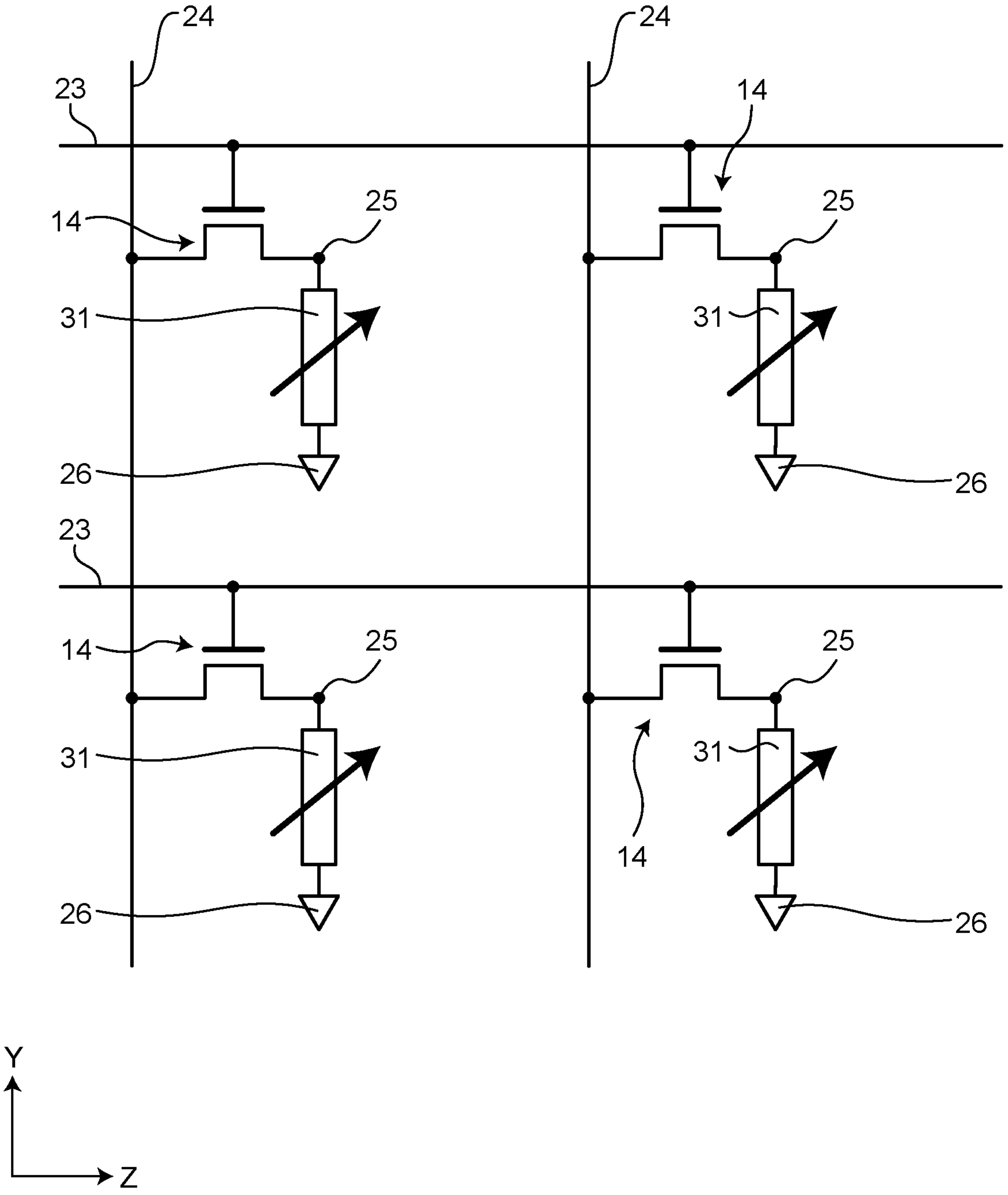
FIG. 5 is a circuit diagram illustrating a circuit configuration of the force distribution sensor of the first embodiment.

FIG. 5 is a circuit diagram illustrating a circuit configuration of the force distribution sensor of the first embodiment. As illustrated in FIG. 5, the gate lines 23 extend in the second planar direction Z. The gate lines 23 are arrayed in the first planar direction Y. The signal lines 24 extend in the first planar direction Y. The signal lines 24 are arrayed in the second planar direction Z. Accordingly, when the gate lines 23 are scanned, the electric states of the array electrodes 25, in other words, electric signals (current values) input to the array electrodes 25 are obtained through the signal lines 24. The magnitudes of the current values obtained through the signal lines 24 are then used to determine the value of force acting on the individual detection regions 4.

As illustrated in FIGS. 2 and 3, the protective sheet 40 includes a bonding layer 41, and a protective base material 42 on which the bonding layer 41 is provided. The bonding layer 41 is provided on a surface 42*a* of the protective base material 42, which faces in the second direction X2. Accordingly, the bonding layer 41 and the protective base material 42 are integrated.

As illustrated in FIG. 1, the protective sheet 40 has an X shape in plan view. Specifically, the protective sheet 40 includes a central part 50 having a rectangular shape and positioned at a central part, and four extended parts 51 extending from the four sides of the central part 50. Accordingly, the protective sheet 40 has a shape obtained by truncating the corners of a square. Corners 30*a* of the sensor sheet 30 do not overlap the protective sheet 40. In other words, the corners 30*a* of the sensor sheet 30 are exposed.

The central part 50 overlaps a central part of the sensor sheet 30 in plan view. A base part 51*a* side of each extended part 51 overlaps an end part of the sensor sheet 30. A distal end part 51*b* side of each extended part 51 overlaps the installation surface 6 of the support substrate 5. A middle part 51*c* between the base part 51*a* and the distal end part 51*b* overlaps the installation surface 6 of the support substrate 5. Accordingly, as illustrated in FIG. 2, the protective sheet 40 includes a first region 70 (the central part 50 and the base parts 51*a* of the extended parts 51) that overlaps the sensor sheet 30 when viewed in the second direction X2 and is bonded to the sensor base material 32, and second regions 80 (the distal end parts 51*b* and the middle parts 51*c* of the extended parts 51) that are positioned outside edge parts of the sensor sheet 30 when viewed in the second direction X2 and are bonded to the installation surface 6.

As illustrated in FIG. 3, the first region 70 (the central part 50 and the base parts 51*a* of the extended parts 51) is bonded to the sensor sheet 30. As illustrated in FIG. 2, the distal end parts 51*b* in the second regions 80 (the distal end parts 51*b* and the middle parts 51*c* of the extended parts 51) are bonded to the installation surface 6. The middle parts 51*c* of the extended parts 51 are separated (floating) from the installation surface 6. A mountain fold line 51*d* is formed between each base part 51*a* and the corresponding middle part 51*c*. A valley fold line 52*e* is formed between each middle part 51*c* and the corresponding distal end part 51*b*.

As described above, the sensor sheet 30 of the first embodiment is supported by the protective sheet 40. The protective sheet 40 is bonded to the installation surface 6 and separable (detachable) from the installation surface 6. With this configuration, the sensor sheet 30 is separated from the array substrate 10 as the protective sheet 40 is peeled off the installation surface 6. The sensor sheet 30 is not bonded to the array substrate 10. Accordingly, no load (stress) is applied to the first surface 10*a* of the array substrate 10 opposite the sensor sheet 30 as the sensor sheet 30 is separated. As a result, damage on the array substrate 10 is avoided. After the protective sheet 40 is peeled, the protective sheet 40 to which a new sensor sheet 30 is bonded is bonded to the installation surface 6, which ends repair of the force distribution sensor 1. Thus, the sensor sheet 30 can be easily replaced.

In a case where the protective sheet 40 has a rectangular shape in plan view (refer to FIG. 6), each corner 43 of the protective sheet 40 couples end parts of extended parts 51. This generates a crease 44 at the corner 43 where mountain fold lines 51*d* and valley fold lines 51*e* of the two extended parts 51 meet, which degrades appearance. However, the protective sheet 40 of the first embodiment has no corners and thus no creases 44 are generated. Accordingly, the force distribution sensor 1 has good appearance.

Although the first embodiment is described above, the present disclosure is not limited to examples described in the first embodiment. For example, the array substrate 10 is fixed by the array substrate bonding layer 13, but the array substrate bonding layer 13 is not essential in the present disclosure. The array substrate 10 is in contact with the sensor layer 31 in the second direction X2 and pressed in the second direction X2. Thus, the array substrate 10 does not necessarily need to be bonded (fixed) to the installation surface 6.

In the present embodiment, the middle parts 51*c* of the extended parts 51 are not bonded to the side surfaces of the array substrate 10, but the protective sheet may be bonded to the side surfaces of the array substrate 10 in the present disclosure. This is because no damage occurs when a load acts since neither the array electrodes 25 nor the common electrodes 26 are provided on the side surfaces of the array substrate 10.

The protective sheet 40 of the present disclosure is not limited to examples described in the embodiment. In second to fourth embodiments, examples in which the shape of the protective sheet 40 is changed will be described. The following description will focus on changes.

Second Embodiment

Figure 6:
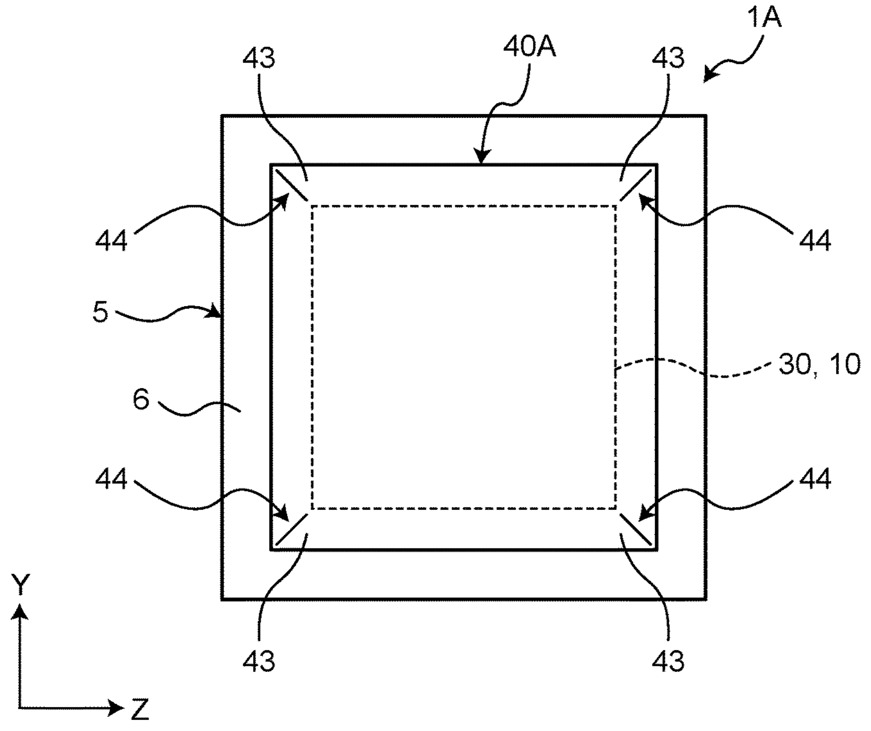
FIG. 6 is a schematic diagram schematically illustrating a force distribution sensor of a second embodiment in plan view.

FIG. 6 is a schematic diagram schematically illustrating a force distribution sensor of the second embodiment in plan view. A protective sheet 40A of this force distribution sensor 1A of the second embodiment is different from the protective sheet 40 of the first embodiment in that the protective sheet 40A has a rectangular shape in plan view. With the force distribution sensor 1A of the second embodiment, as well, it is possible to replace the sensor sheet 30 while avoiding damage on the array substrate 10 as in the first embodiment. With the protective sheet 40A of the second embodiment, the array substrate 10 is sealed. Accordingly, liquid and oxygen are prevented from contacting the array substrate 10, and degradation of the array substrate 10 is prevented. However, each corner 43 of the protective sheet 40A is coupled to two adjacent extended parts 51. The crease 44 is generated at the corner 43 where the mountain fold lines 51*d* and the valley fold lines 51*e* of the two extended parts 51 meet.

Third Embodiment

Figure 7:
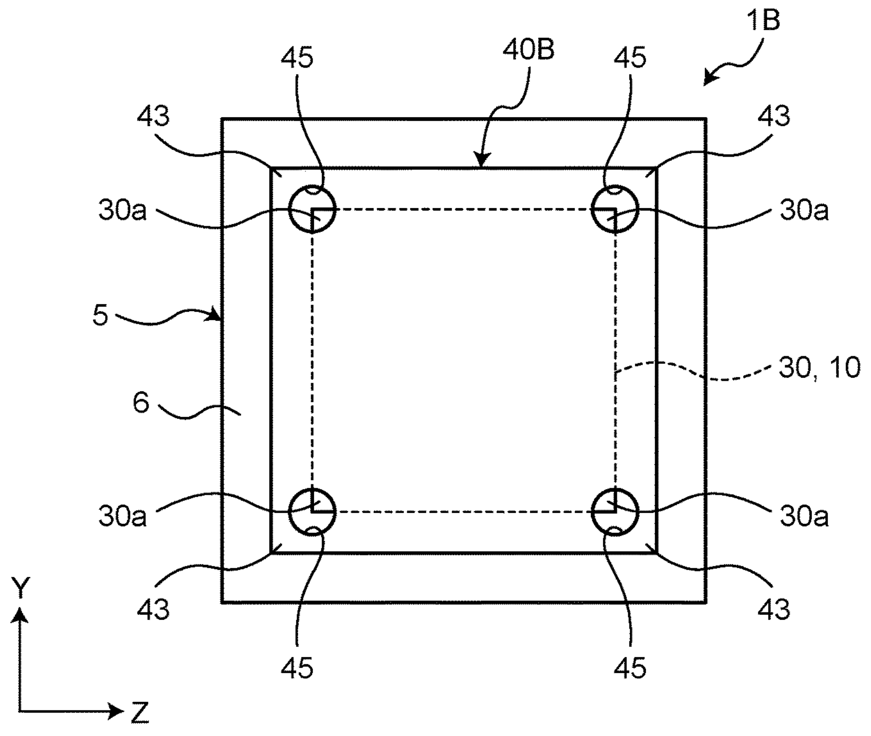
FIG. 7 is a schematic diagram schematically illustrating a force distribution sensor of a third embodiment in plan view.

FIG. 7 is a schematic diagram schematically illustrating a force distribution sensor of the third embodiment in plan view. A protective sheet 40B of this force distribution sensor 1B of the third embodiment is different from the protective sheet 40A of the second embodiment in that circular holes 45 are formed. The holes 45 are disposed at the respective corners 43 of the protective sheet 40B. Accordingly, the corners 30*a* of the sensor sheet 30 are exposed in the first direction X1 through the holes 45. Creases are unlikely to be generated at the protective sheet 40B of the third embodiment since parts of the corners 43 of the protective sheet 40B are cut out.

Fourth Embodiment

Figure 8:
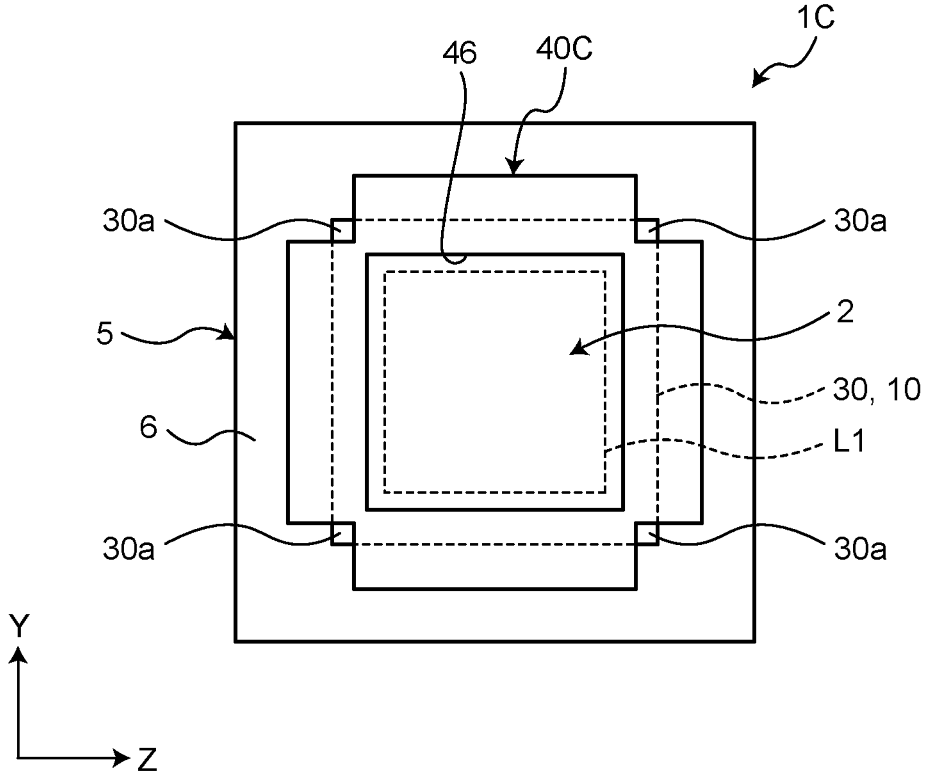
FIG. 8 is a schematic diagram schematically illustrating a force distribution sensor of a fourth embodiment in plan view.

FIG. 8 is a schematic diagram schematically illustrating a force distribution sensor of the fourth embodiment in plan view. A protective sheet 40C of this force distribution sensor 1C of the fourth embodiment is different from the protective sheet 40 of the first embodiment in that an opening part 46 having a rectangular shape in plan view is formed at a central part. Accordingly, part of the sensor sheet 30 is exposed in the first direction X1 through the opening part 46. The opening part 46 is larger than the detection region 2. In other words, the protective sheet 40C is not provided in the entire area of the detection region 2. Accordingly, the force distribution sensor 1C of the fourth embodiment has improved sensitivity of detecting force.

Although the protective sheets of the other embodiments are described above, each of the above-described protective sheets is integrated (one sheet) but may be a plurality of separated protective sheets such as four protective sheets that fix the respective sides of the sensor sheet 30 in the present disclosure. The following describes fifth and sixth embodiments as modifications of the installation surface 6 of the first embodiment.

Fifth Embodiment

Figure 9:
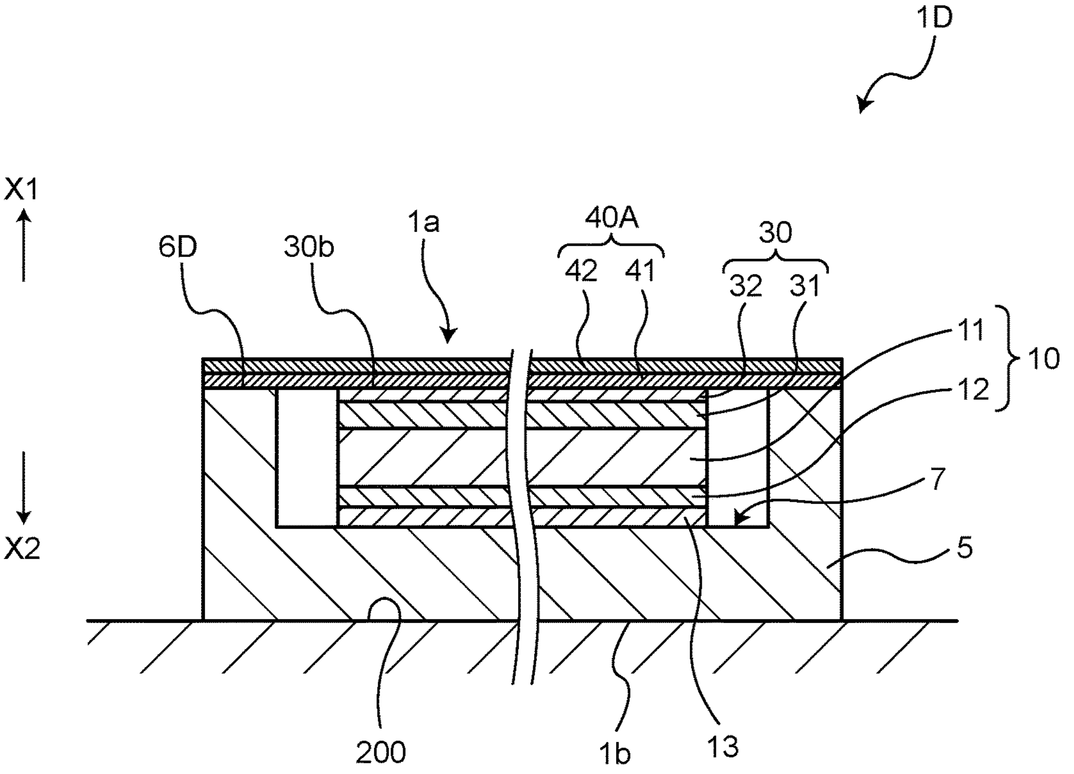
FIG. 9 is a schematic diagram schematically illustrating a sectional view of a force distribution sensor of a fifth embodiment.

FIG. 9 is a schematic diagram schematically illustrating a sectional view of a force distribution sensor of the fifth embodiment. An installation surface 6D of this force distribution sensor 1D of the fifth embodiment is different from the installation surface 6 of the first embodiment in that a recessed part 7 that is recessed in the second direction X2 is formed. The array substrate 10 and the sensor sheet 30 are housed in the recessed part 7. With this configuration, a surface 30*b* of the sensor sheet 30, which faces in the first direction X1 and the installation surface 6D have the same height. Thus, the protective sheet 40A can be used in a flat plate shape without bending. Accordingly, no mountain fold lines 51*d* nor valley fold lines 52*e* are formed on the protective sheet 40A and no creases are generated.

The force distribution sensor 1D of the fifth embodiment includes the protective sheet 40A having a rectangular shape in plan view, which is described in the second embodiment. The protective sheet 40A seals the recessed part 7 in the first direction X1. Accordingly, liquid and oxygen are prevented from contacting the array substrate 10, and degradation of the array substrate 10 is prevented.

Sixth Embodiment

Figure 10:
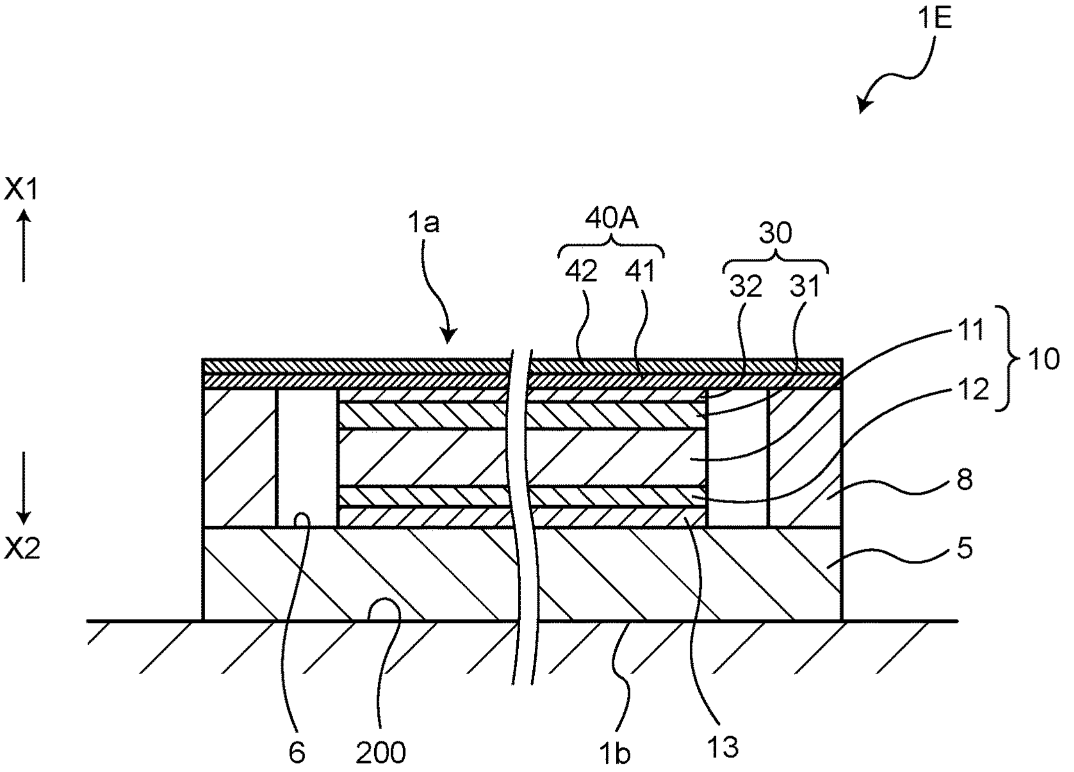
FIG. 10 is a schematic diagram schematically illustrating a sectional view of a force distribution sensor of a sixth embodiment.

FIG. 10 is a schematic diagram schematically illustrating a sectional view of a force distribution sensor of the sixth embodiment. This force distribution sensor 1E of the sixth embodiment is different from the force distribution sensor 1 of the first embodiment in that a spacer 8 having a frame shape is provided on the installation surface 6. Specifically, the spacer 8 having a frame shape is interposed between the protective sheet 40A and the installation surface 6. The spacer 8 is fixed to the installation surface 6 by a non-illustrated bonding layer. The array substrate 10 and the sensor sheet 30 are housed inside the spacer 8. With this configuration, the surface 30*b* of the sensor sheet 30, which faces in the first direction X1 and the installation surface 6D have the same height. Thus, the protective sheet 40A can be used in a flat plate shape without bending. Accordingly, no mountain fold lines 51*d* nor valley fold lines 52*e* are formed on the protective sheet 40A and no creases are generated. Similarly to the sixth embodiment, the array substrate 10 is sealed by the protective sheet 40A and degradation of the array substrate 10 is prevented.

The other embodiments in which the installation surface 6 is modified are described above, but the installation surface 6 of the present disclosure is not limited to a surface provided to the support substrate 5. For example, the installation surface 6 may be the plane 200 such as a road surface, a floor surface, or a wall surface. Thus, the support substrate 5 is not an essential component in the present disclosure. Furthermore, the installation surface 6 of the present disclosure is not limited to a flat plate shape. The installation surface may be a cylindrical outer peripheral surface of, for example, a handrail. The following describes a force distribution sensor attached to a cylindrical installation surface.

Seventh Embodiment

Figure 11:
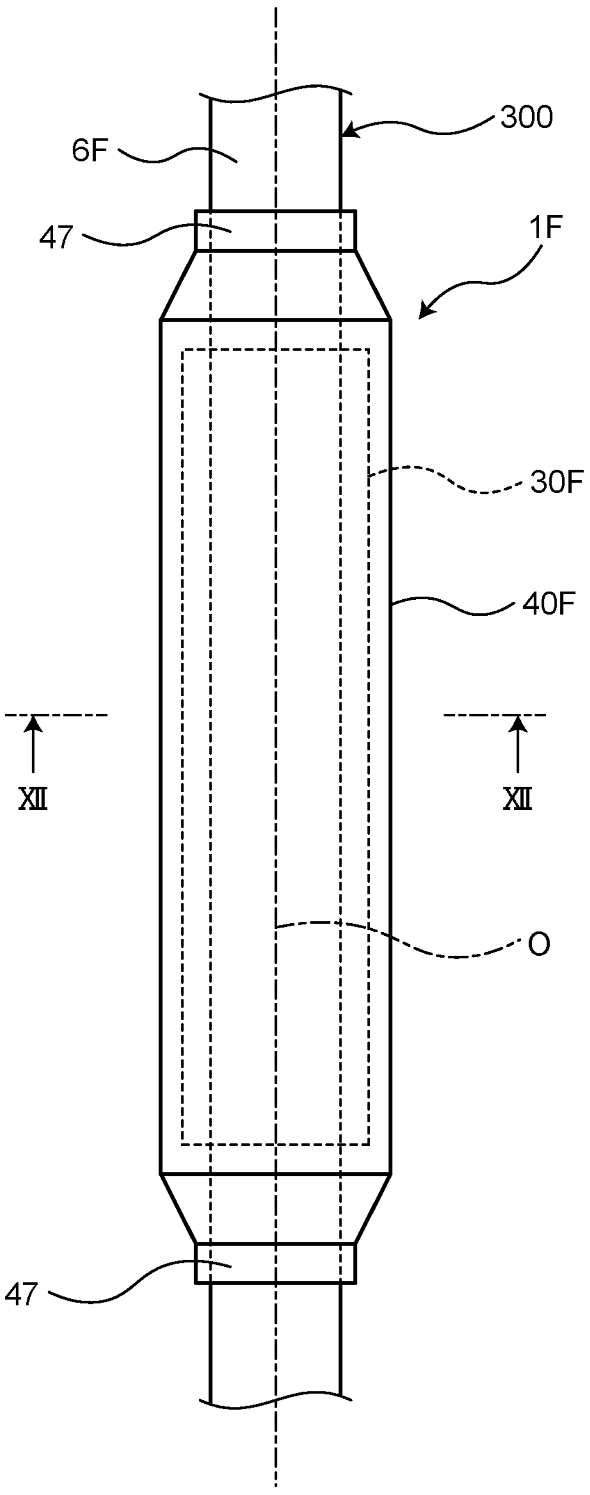
FIG. 11 is a schematic diagram schematically illustrating a force distribution sensor of a seventh embodiment.
Figure 12:
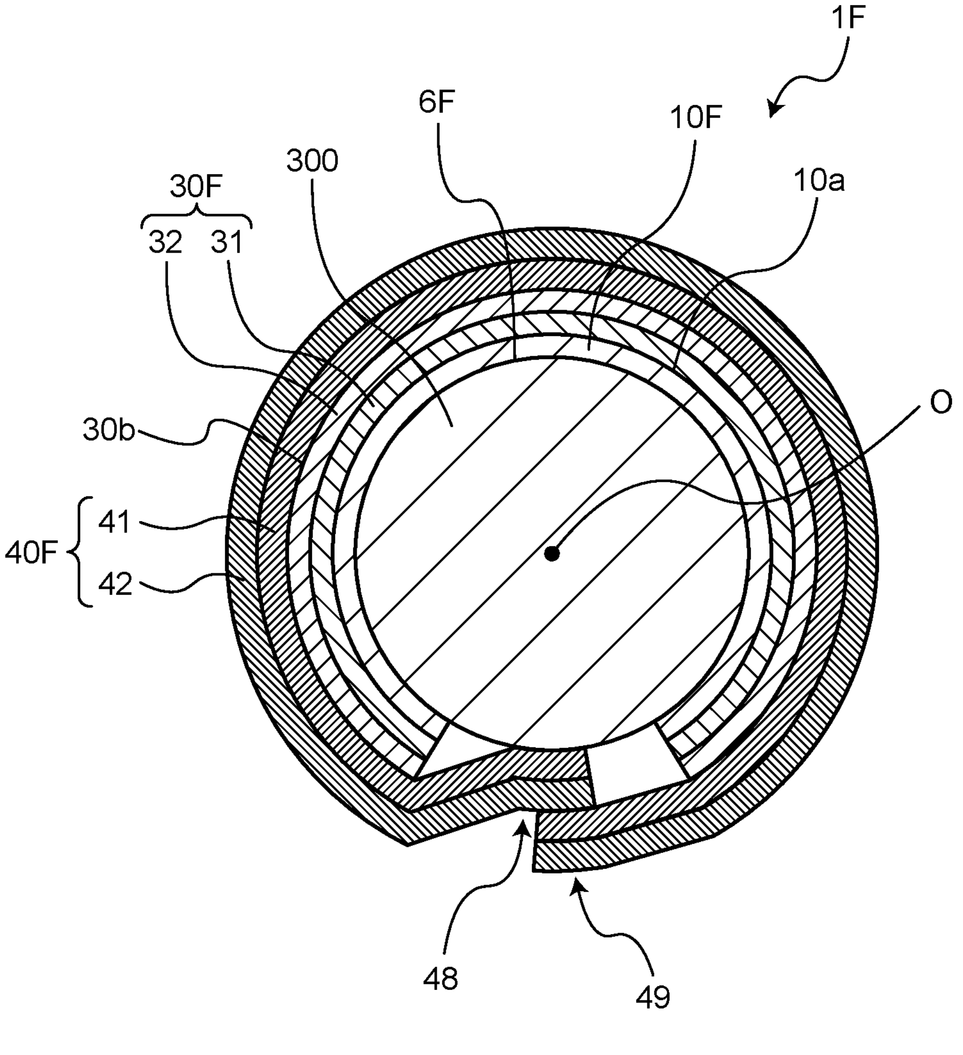
FIG. 12 is a sectional view taken along line XII-XII in FIG. 11 when viewed in the direction of arrows.

FIG. 11 is a schematic diagram schematically illustrating a force distribution sensor of a seventh embodiment. FIG. 12 is a sectional view taken along line XII-XII in FIG. 11 when viewed in the direction of arrows. As illustrated in FIGS. 11 and 12, this force distribution sensor 1F of the seventh embodiment is attached to a cylinder component 300. The cylinder component 300 has a cylindrical shape, and the outer peripheral surface of the cylinder component 300 is an installation surface 6F. Accordingly, the installation surface 6F has a cylindrical shape. Hereinafter, a direction parallel to a central axis O of the installation surface 6F (cylinder component 300) is referred to as an axial direction.

As illustrated in FIG. 12, the force distribution sensor 1F of the seventh embodiment includes an array substrate 10F installed on the installation surface 6F, a sensor sheet 30F disposed outside the array substrate 10F in the radial direction, and a protective sheet 40F disposed outside the sensor sheet 30F in the radial direction. In the seventh embodiment, the first direction X1 is outside in the radial direction, and the second direction X2 is inside in the radial direction.

The array substrate 10F, the sensor sheet 30F, and the protective sheet 40F have a circular arc shape along the installation surface 6F in a sectional view. The array substrate 10F is fixed to the installation surface 6F by a non-illustrated array substrate bonding layer. The sensor sheet 30F is in contact with the first surface 10*a* of the array substrate 10F as in the other embodiments but is not bonded to the first surface 10*a*. The surface 30*b* of the sensor sheet 30F, which faces outside in the radial direction is bonded to the bonding layer 41 of the protective sheet 40F. Accordingly, the sensor sheet 30F is supported by the protective sheet 40F. A stretchable base material partially having a meander shape may be used as the array base material 12 of the array substrate 10F. The stretchable base material is excellent in stretchability and flexibility. A load on the array electrodes 25 and the common electrodes 26 is reduced.

As illustrated in FIG. 11, both end parts 47 and 47 of the protective sheet 40F in the axial direction are bonded to the installation surface 6F. As illustrated in FIG. 12, one end part 48 of the protective sheet 40F in the circumferential direction is bonded to the installation surface 6F. The other end part 49 of the protective sheet 40F in the circumferential direction is bonded to the one end part 48 of the protective sheet 40F in the circumferential direction from outside in the radial direction (second direction X2).

As described above, according to the force distribution sensor 1F of the seventh embodiment, the sensor sheet 30F is separated from the array substrate 10F as the protective sheet 40F is peeled off. No load is applied to the array substrate 10F. Accordingly, the sensor sheet 30F can be easily replaced. Although the present embodiment is described with the example in which the one end part 48 and the other end part 49 of the protective sheet 40F overlap in the radial direction, the one end part 48 and the other end part 49 may be each bonded to the installation surface 6F without overlapping each other.

In a force distribution sensor of a conventional technology, an array substrate and a sensor sheet that have the same size are integrated. The array substrate has a smaller curvature than the sensor sheet when the array substrate and the sensor sheet are bent in a circular arc shape so that the array substrate and the sensor sheet extend along the installation surface 6F. Accordingly, compressive stress in the circumferential direction acts on the array substrate, and stress on the array substrate increases. Alternatively, the sensor sheet disposed on the outer periphery side is subjected to stress with which the sensor sheet has a longer length in the circumferential direction (extends further in the circumferential direction) than the array substrate. Accordingly, the resistance value of the sensor layer may differ from a predetermined value. However, according to the present embodiment, the sensor sheet 30F and the array substrate 10F are separated from each other. Accordingly, compressive stress acting on the array substrate 10F and tensile stress acting on the sensor sheet 30F are prevented.

Eighth Embodiment

Figure 13:
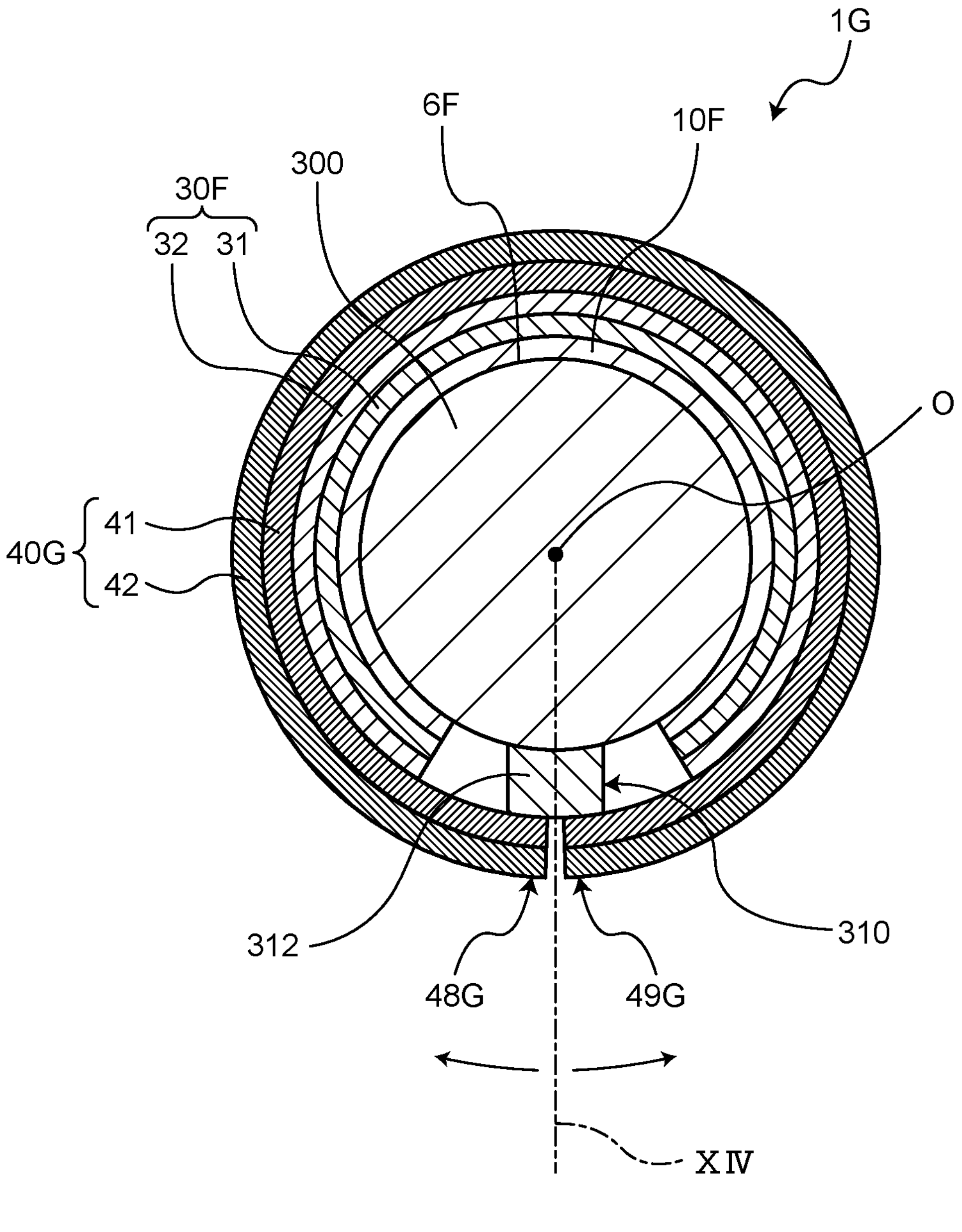
FIG. 13 is a sectional view of a force distribution sensor of an eighth embodiment.
Figure 14:
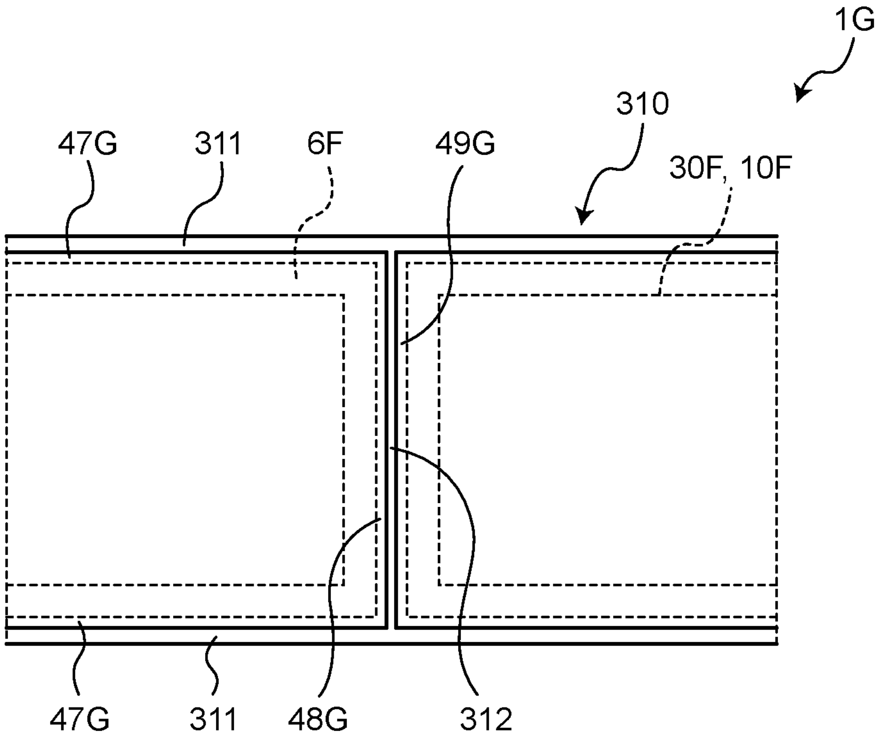
FIG. 14 is a developed view of the force distribution sensor when cut along line XIV-XIV in FIG. 13 and expanded in the direction of arrows.

FIG. 13 is a sectional view of a force distribution sensor of an eighth embodiment. FIG. 14 is a developed view of the force distribution sensor when cut along line XIV-XIV in FIG. 13 and expanded in the direction of arrows. As illustrated in FIG. 13, this force distribution sensor 1G of the eighth embodiment is different from that of the seventh embodiment in that a protective sheet 40G is bonded to the installation surface 6F through a spacer 310. As illustrated in FIG. 14, the spacer 310 includes a pair of annular walls 311 and 311 each having an annular shape and extending in the circumferential direction, and a partition wall 312 extending in the axial direction between the pair of annular walls 311 and 311. The spacer 310 is bonded to the installation surface 6F by a non-illustrated bonding layer.

Both end parts of the partition wall 312 in the axial direction are coupled to the pair of annular walls 311 and 311. The array substrate 10F and the sensor sheet 30F are housed inside the spacer 310. Both end parts 47G and 47G of the protective sheet 40G in the axial direction are bonded to the pair of annular walls 311 and 311 from outside in the radial direction (second direction X2). One end part 48G and the other end part 49G of the protective sheet 40G in the circumferential direction are bonded to the partition wall 312 from outside in the radial direction (second direction X2). With the force distribution sensor 1G of the eighth embodiment described above, as well, a sensor sheet 30G can be easily replaced without a load on the array substrate

10F as in the other embodiments. Generation of creases on the protective sheet 40G is prevented. In addition, degradation of the array substrate 10F is prevented since the spacer 310 is sealed by the protective sheet 40G.

Ninth Embodiment

Figure 15:
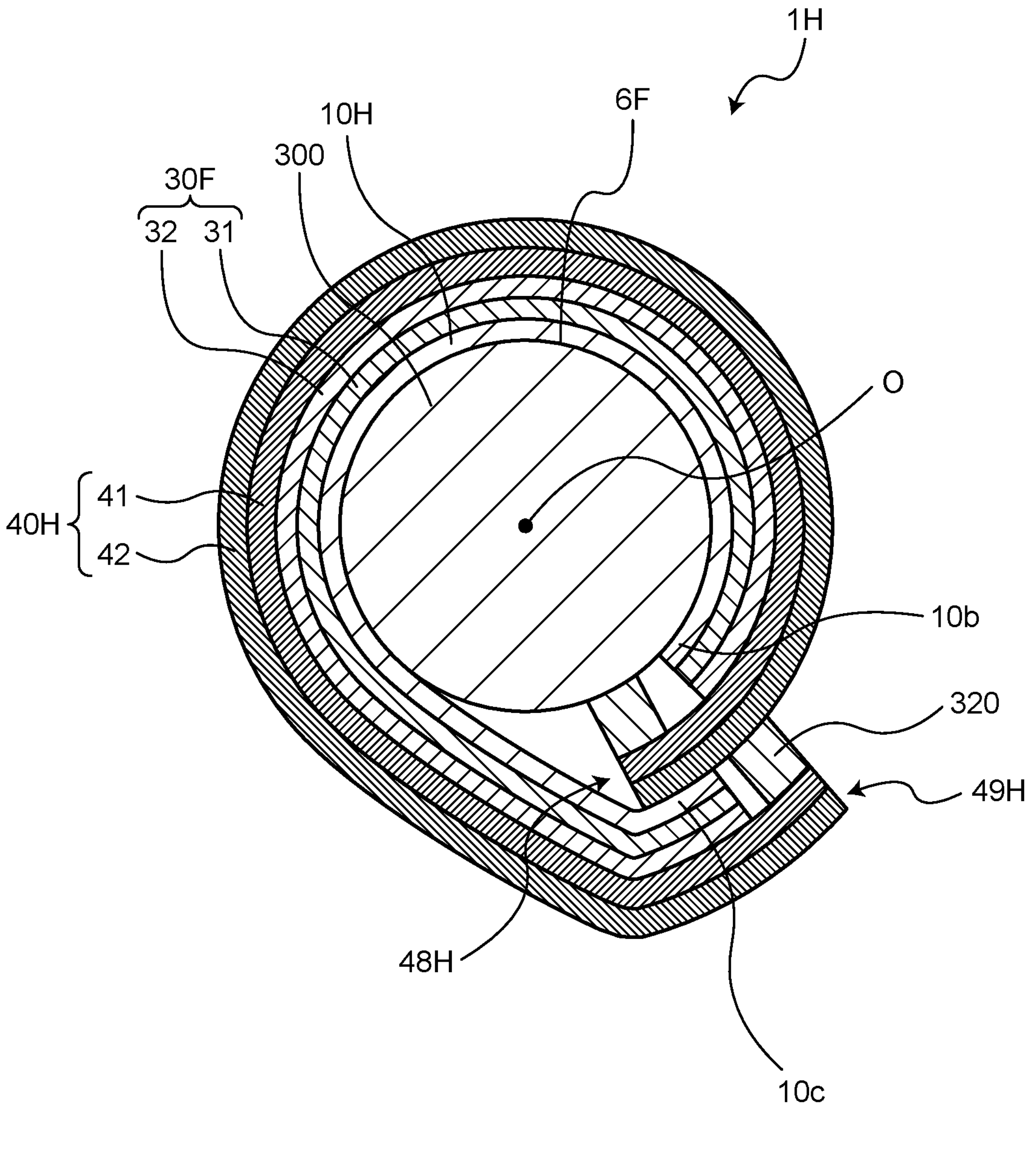
FIG. 15 is a sectional view of a force distribution sensor of a ninth embodiment.

FIG. 15 is a sectional view of a force distribution sensor of a ninth embodiment. As illustrated in FIG. 15, this force distribution sensor 1H of the ninth embodiment is different from that of the seventh embodiment in that a spacer 320 is provided. The spacer 320 has a rectangular frame shape and extends along an edge part of a protective sheet 40H. The spacer 320 is bonded to the bonding layer 41 and integrates the protective sheet 40H. An array substrate 10H and the sensor sheet 30F are housed inside the spacer 320.

Although not particularly illustrated, both end parts of the protective sheet 40H in the axial direction are bonded to the installation surface 6F through the spacer 320. One end part 10*b* of the array substrate 10F in the circumferential direction is bonded to the installation surface 6F by a non-illustrated bonding layer. One end part 48H of the protective sheet 40H in the circumferential direction is bonded to the installation surface 6F through the spacer 320.

The other end part 10*c* of the array substrate 10F in the circumferential direction overlaps the one end part 48H of the protective sheet 40H from outside in the radial direction and is bonded to the one end part 48H by a non-illustrated bonding layer. The other end part 49H of the protective sheet 40H in the circumferential direction overlaps the one end part 48H of the protective sheet 40H from outside in the radial direction and is bonded to the one end part 48H through the spacer 320. With the force distribution sensor 1H of the ninth embodiment described above, as well, the sensor sheet 30G can be replaced without a load on the array substrate 10F when the protective sheet 40H is peeled off as in the first embodiment.

As described above, the force distribution sensor of each of the first to ninth embodiments includes a protective sheet, but in the following description, a force distribution sensor including no protective sheet will be described below.

Tenth Embodiment

Figure 16:
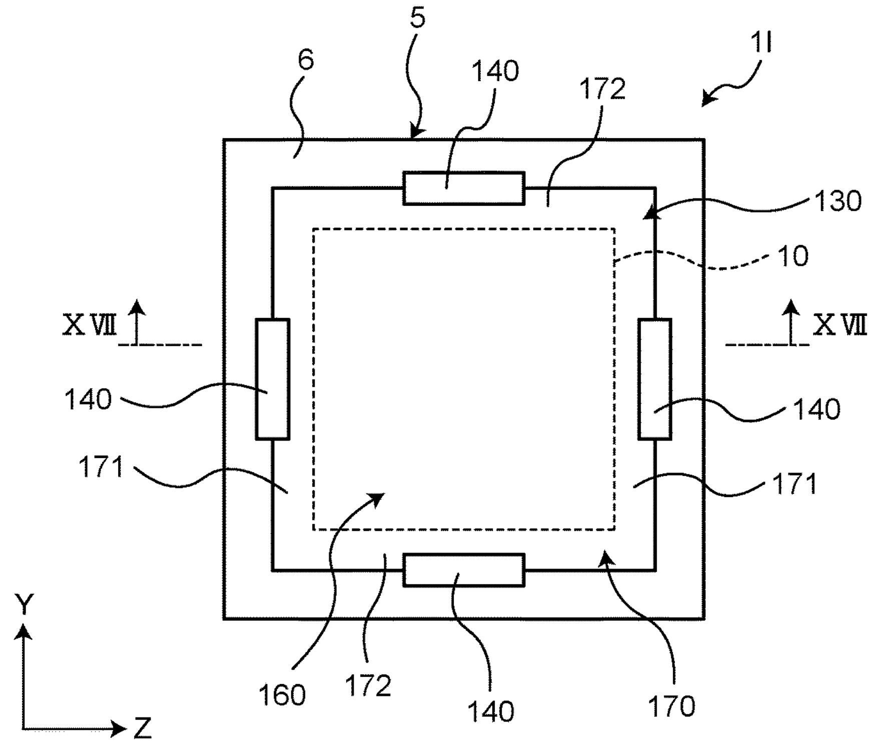
FIG. 16 is a schematic diagram schematically illustrating a force distribution sensor of a tenth embodiment.
Figure 17:
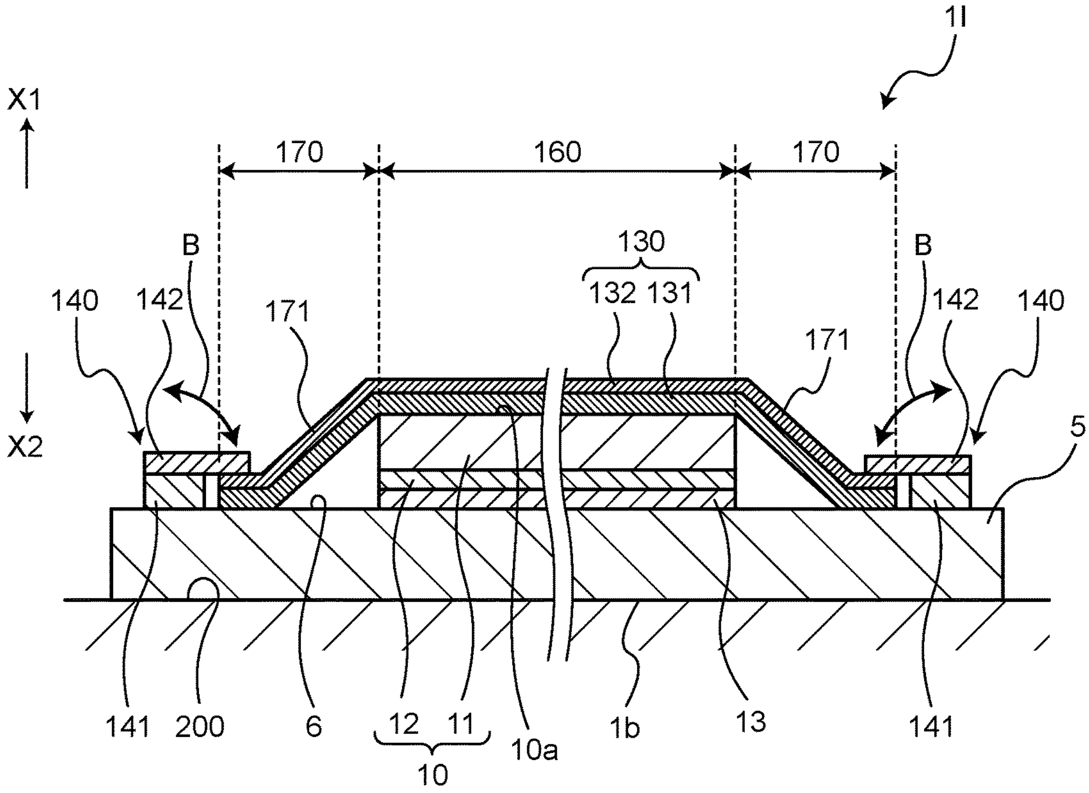
FIG. 17 is a sectional view taken along line XVII-XVII in FIG. 16 when viewed in the direction of arrows.

FIG. 16 is a schematic diagram schematically illustrating a force distribution sensor of a tenth embodiment. FIG. 17 is a sectional view taken along line XVII-XVII in FIG. 16 when viewed in the direction of arrows. This force distribution sensor 1I includes the support substrate 5, the array substrate 10 and a sensor sheet 130 that are stacked in order on the installation surface 6 of the support substrate 5, and a fixation component 140 fixed to the installation surface 6. The support substrate 5 and the array substrate 10 are the same as in the first embodiment, and thus detailed description thereof is omitted.

As illustrated in FIG. 16, the sensor sheet 130 has a rectangular shape in plan view. The sensor sheet 130 is larger than the array substrate 10. Accordingly, the sensor sheet 130 includes an opposite region 160 overlapping the array substrate 10 when viewed in the second direction X2, and an outside region 170 positioned outside an edge part of the array substrate 10 when viewed in the second direction X2. The outside region 170 has a rectangular frame shape. Specifically, the outside region 170 includes a pair of first extended parts 171 and 171 extending in the first planar direction Y and a pair of second extended parts 172 and 172 extending in the second planar direction Z.

As illustrated in FIG. 17, the sensor sheet 130 includes a sensor layer 131 and a sensor base material 132. The sensor layer 131 is provided on the entire surface of the sensor base material 132 in the first direction X1. Accordingly, the sensor layer 131 and the sensor base material 132 have the same size in plan view. With this configuration, the entire first surface 10*a* of the array substrate 10 is reliably positioned opposite the sensor layer 131 even when the position of the sensor layer 131 is shifted in the first planar direction Y or the second planar direction Z. The sensor layer 131 is in contact with the array substrate 10 but is not bonded thereto.

The fixation component 140 includes a body part 141 fixed to the support substrate 5, and a movable part 142 that contacts the outside region 170 in the second direction X2. With the fixation component 140, part of the outside region 170 is sandwiched between the movable part 142 and the installation surface 6, and the sensor sheet 130 is fixed. As illustrated in FIG. 16, four fixation components 140 are provided. Each fixation component 140 fixes a first extended part 171 or a second extended part 172. Accordingly, the sensor sheet 130 is fixed by the fixation components 140 in an immovable manner. Each movable part 142 is rotatably attached to the body part 141. Specifically, each body part 141 is supported to a non-illustrated rotation shaft so that the body part 141 can swing up in the first direction X1 (refer to arrow I).

As described above, with the force distribution sensor 1I of the tenth embodiment, the state in which the sensor sheet 130 is sandwiched is canceled by swinging up the movable part 142 in the first direction X1, and accordingly, the sensor sheet 130 can be separated from the array substrate 10. No load is applied to the first surface 10*a* of the array substrate 10 opposite the sensor sheet 30 when the sensor sheet 130 is separated. As a result, damage on the array substrate 10 is avoided. According to the present embodiment described above, the sensor sheet 130 can be easily replaced. In addition, sensitivity of detecting force is improved since no protective sheet 40 is disposed in the first direction X1 relative to the sensor sheet 130.

Although the tenth embodiment is described above, a fixation component of the present disclosure only needs to be able to detachably fix the sensor sheet 130 and is not limited to the fixation component 140 including the movable parts 142 that are movable. For example, the fixation component may detachably fix the sensor sheet by means of a magnet. Alternatively, the fixation component may detachably fix the sensor sheet by means of clips.

Eleventh Embodiment

Figure 18:
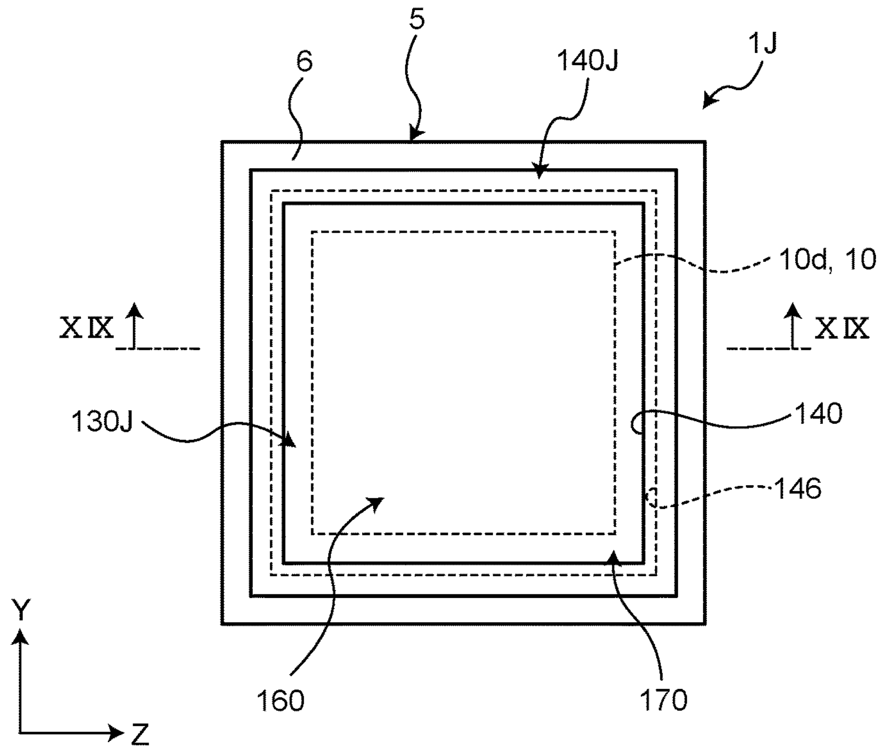
FIG. 18 is a schematic diagram schematically illustrating a force distribution sensor of an eleventh embodiment.
Figure 19:
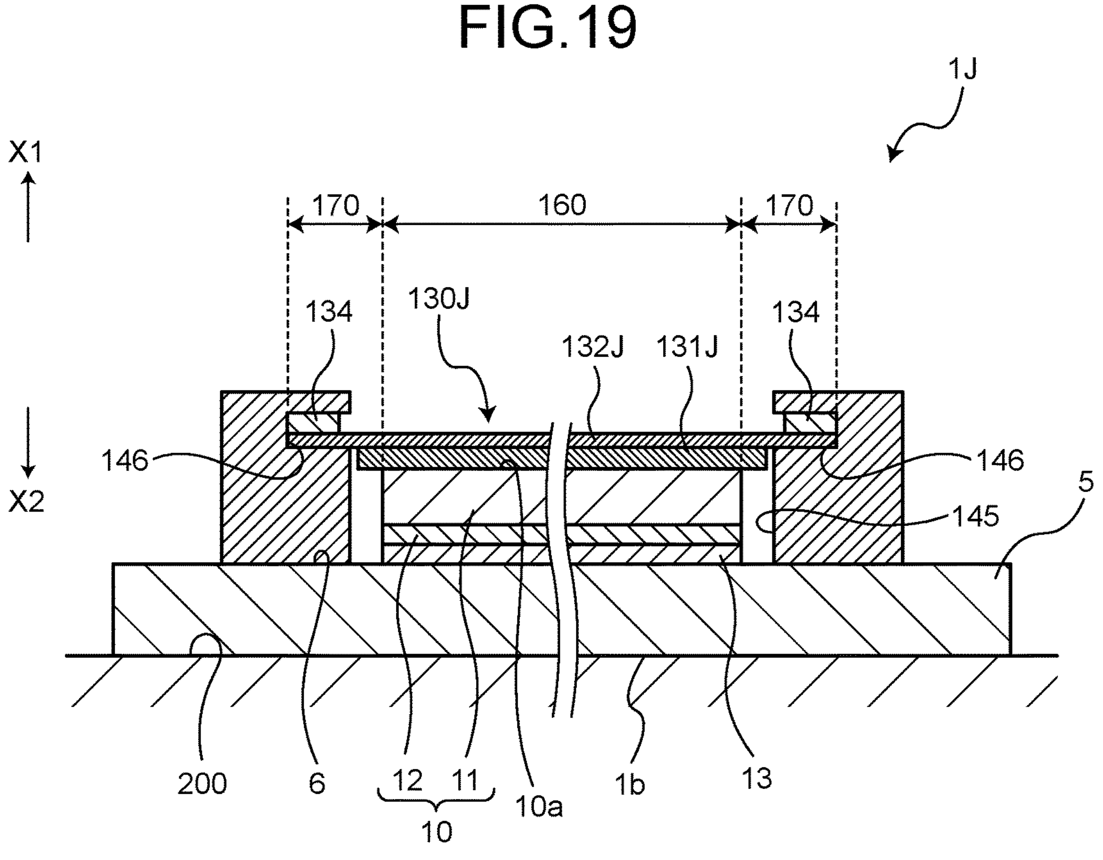
FIG. 19 is a sectional view taken along line XIX-XIX in FIG. 18 when viewed in the direction of arrows.

FIG. 18 is a schematic diagram schematically illustrating a force distribution sensor of an eleventh embodiment. FIG. 19 is a sectional view taken along line XIX-XIX in FIG. 18 when viewed in the direction of arrows. As illustrated in FIGS. 18 and 19, this force distribution sensor 1J includes the support substrate 5, the array substrate 10 and a sensor sheet 130J that are stacked in order on the installation surface 6 of the support substrate 5, and a fixation component 140J fixed to the installation surface 6. As illustrated in FIG. 18, the sensor sheet 130J includes the opposite region 160 overlapping the array substrate 10 when viewed in the second direction X2, and the outside region 170 positioned outside an edge part 10*d* of the array substrate 10 when viewed in the second direction X2.

As illustrated in FIG. 19, a sensor layer 131J is provided only at a central part of a sensor base material 132J.

However, the sensor layer 131J is larger than the array substrate 10. Accordingly, part of the sensor layer 131J is disposed in the outside region 170. With the sensor sheet 130J, the entire first surface 10*a* of the array substrate 10 is reliably positioned opposite the sensor layer 131J even when the position of the sensor layer 131J is shifted in the first planar direction Y or the second planar direction Z. A bonding layer 134 is provided in the first direction X1 relative to the outside region 170 of the sensor base material 132J.

As illustrated in FIG. 18, the fixation component 140J has a rectangular frame shape in plan view. A groove 146 is formed at an inner peripheral surface 145 of the fixation component 140J. The groove 146 extends in an annular shape in the circumferential direction. The outside region 170 of the sensor sheet 130J enters inside the groove 146. The bonding layer 134 is bonded to the inner surface of the groove 146. Accordingly, the sensor sheet 130J and the fixation component 140J are integrated. The fixation component 140J is fastened to the support substrate 5 by a non-illustrated screw and detachably fixed to the support substrate 5.

In the force distribution sensor 1J of the eleventh embodiment described above, the fixation component can be removed from the support substrate 5 by removing the non-illustrated screw. The sensor sheet is separated from the array substrate 10 as the fixation component is removed. No load is applied to the array substrate 10 since the sensor sheet 30 is not bonded to the first surface 10*a* of the array substrate 10 positioned opposite. In the present disclosure, a seal material may be inserted into the groove 146 to improve sealing of the fixation component 140J.

Although the eleventh embodiment is described above with the example in which a screw is used as a component for fixing the fixation component 140J to the support substrate 5, the present disclosure may use a magnet. Alternatively, the fixation component 140J may be hooked by a claw part and fixed to the support substrate 5. Alternatively, a groove may be formed at the installation surface 6 to fix the fixation component 140J by fitting to the groove.

Twelfth Embodiment

Figure 20:
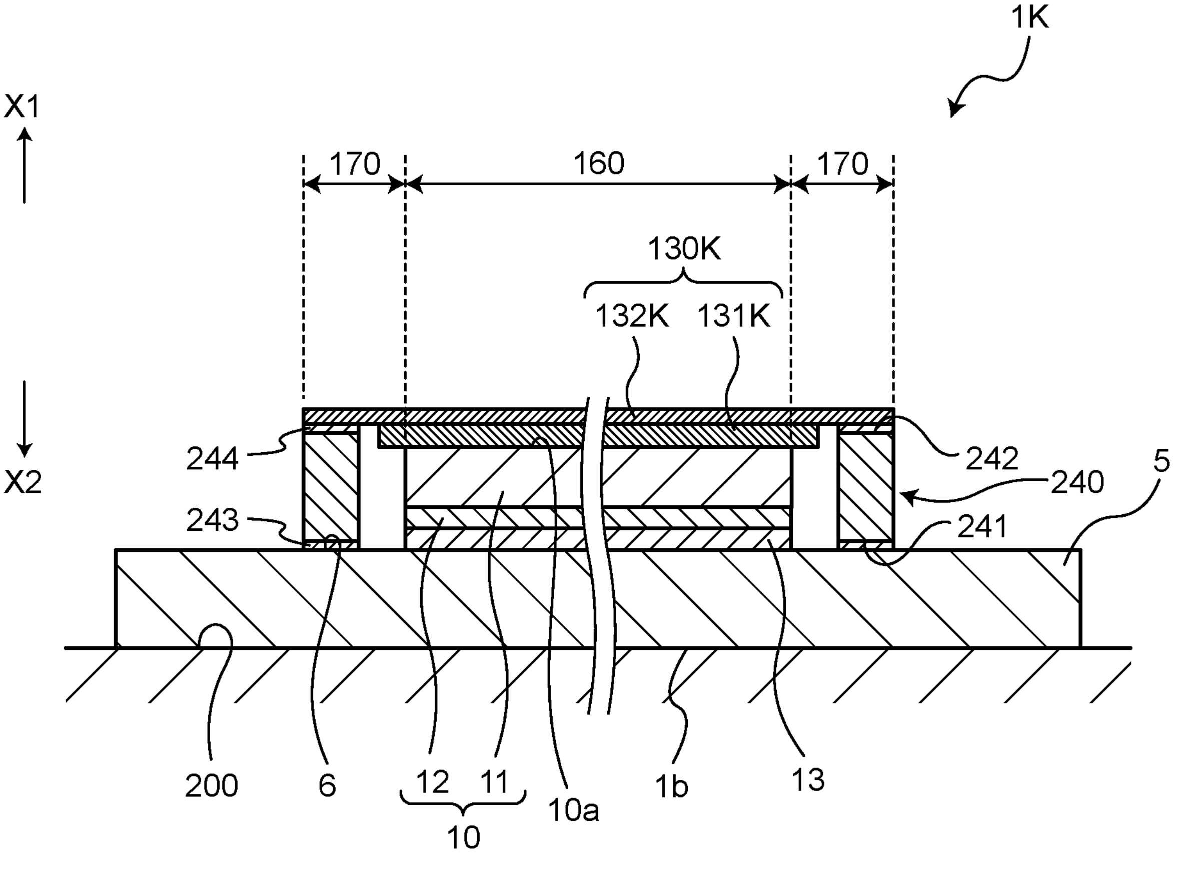
FIG. 20 is a sectional view schematically illustrating a force distribution sensor of a twelfth embodiment.

FIG. 20 is a sectional view schematically illustrating a force distribution sensor of a twelfth embodiment. As illustrated in FIG. 20, this force distribution sensor 1K includes the support substrate 5, the array substrate 10 and a sensor sheet 130K that are stacked in order on the installation surface 6 of the support substrate 5, and a spacer 240. The sensor sheet 130K includes the opposite region 160 overlapping the array substrate 10 when viewed in the second direction X2, and the outside region 170 positioned outside the edge part 10*d* of the array substrate 10 when viewed in the second direction X2. A sensor layer 131K is provided only at a central part of a sensor base material 132K.

The spacer 240 has a rectangular frame shape. The array substrate 10 and the sensor layer 131K are housed inside the spacer 240. The spacer 240 has a bottom surface 241 facing in the second direction X2 and opposite the installation surface 6, and an upper surface 242 facing in the first direction X1 and opposite the outside region 170, and in addition, a first bonding layer 243 that bonds the bottom surface 241 and the installation surface 6 is provided on the bottom surface 241 of the spacer 240. A second bonding layer 244 that bonds the upper surface 242 and the outside region 170 is provided on the upper surface 242 of the spacer 240. The spacer 240 is, for example, a resin material or a double-sided adhesive tape.

In the force distribution sensor 1K of the twelfth embodiment described above, the sensor sheet 130K is supported by the spacer 240. The spacer 240 is detachably fixed to the installation surface 6 by the second bonding layer 244. Accordingly, the sensor sheet 130K is separated from the array substrate 10 as the spacer 240 is peeled off the support substrate 5. No load is applied to the array substrate 10 since the sensor sheet 130K is not bonded to the first surface 10*a* of the array substrate 10 positioned opposite.

Thirteenth Embodiment

Figure 21:
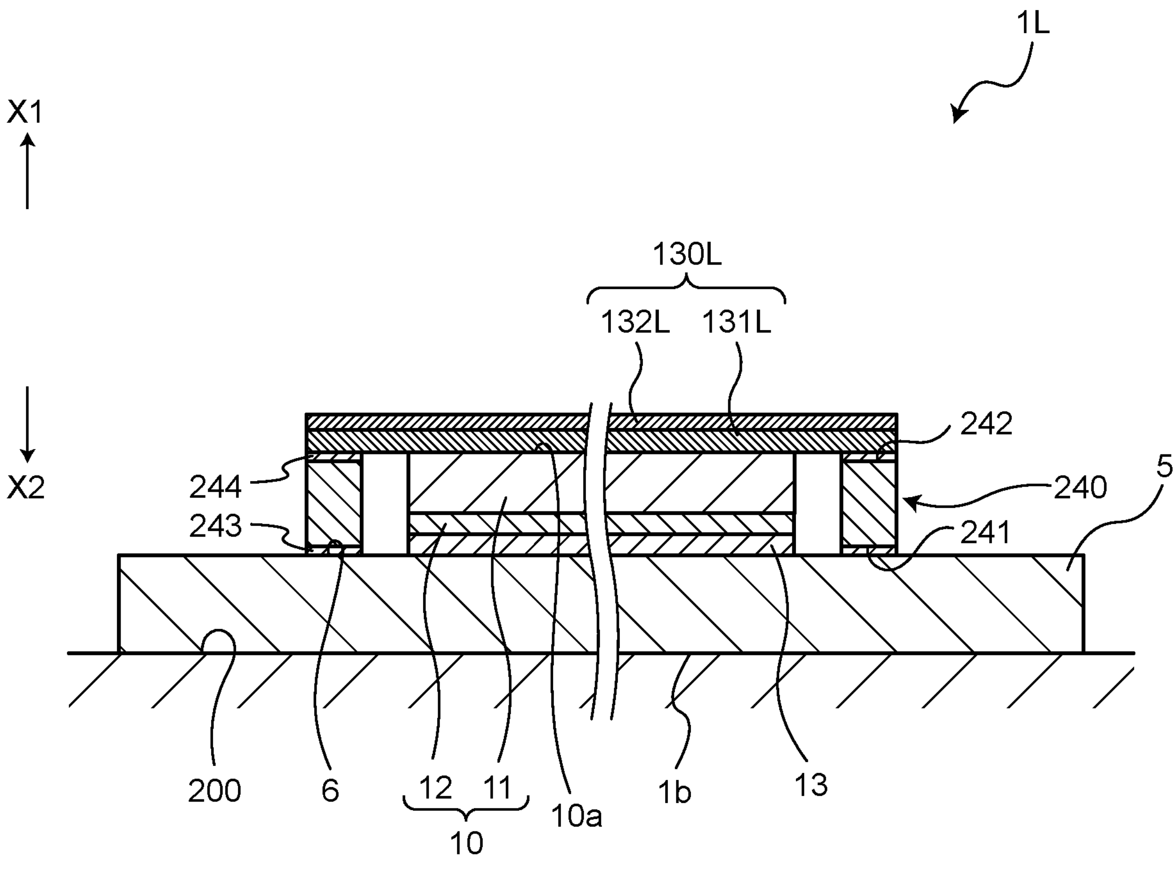
FIG. 21 is a sectional view schematically illustrating a force distribution sensor of a thirteenth embodiment.

FIG. 21 is a sectional view schematically illustrating a force distribution sensor of a thirteenth embodiment. As illustrated in FIG. 21, a sensor sheet 130L of this force distribution sensor 1L of the thirteenth embodiment is different from the sensor sheet 130K of the twelfth embodiment in that a sensor layer 131L is entirely provided on a sensor base material 132L. In a case where such a sensor sheet 130L is used, the second bonding layer 244 of the spacer 240 is bonded to the sensor layer 131L. According to the present embodiment as well, the sensor sheet 130L can be replaced without a load on the array substrate 10.

The sensor layer of each embodiment described above is in contact with the first surface 10*a* of the array substrate 10, but a sensor layer of the present disclosure may be separated from the first surface 10*a* so that the sensor layer contacts the array electrodes 25 and the common electrodes 26 upon force input. Although the surface of the sensor layer of each embodiment in the second direction X2 is a plane, irregularities may be formed at the surface of the sensor layer of the present disclosure in the second direction X2 so that the contact area of the array electrodes 25 and the common electrodes 26 increases as input force increases. With this configuration, the amount of current flowing to the array electrodes 25 increases as the contact area increases.

Although the sensor layer of each embodiment is a resin layer containing conductive fine particles inside, the present disclosure is not limited thereto. For example, the sensor layer may be manufactured of a conductive resin. This sensor layer of the conductive resin is not in contact with the array electrodes 25 and the common electrodes 26 in a state before force input. Then, upon force input, the sensor layer of the conductive resin contacts the array electrodes 25 and the common electrodes 26 and current flows to the array electrodes 25. As input force increases, the contact area of the sensor layer of the conductive resin with the array electrodes 25 and the common electrodes 26 increases and the amount of current flowing to the array electrodes 25 increases as well. Accordingly, the input force can be detected.

Although the common electrodes 26 of each embodiment are provided on the first surface 10*a* of the array substrate 10, common electrodes of the present disclosure may be provided in the first direction X1 relative to a sensor layer. In other words, the sensor layer may be sandwiched between the common electrodes and the array electrodes.

What is claimed is:

1. A force distribution sensor comprising an first substrate, a sensor sheet, and a protective sheet that are stacked in order on a predetermined installation surface, wherein the first substrate includes a first surface on which the sensor sheet is disposed and that faces in a first direction, and a plurality of electrodes provided on the first surface, the sensor sheet includes a sensor base material having a second surface facing in a second direction opposite the first direction, and a sensor layer provided on the second surface and facing the electrodes, the protective sheet includes a protective base material, and a bonding layer provided on a surface of the protective base material, the surface facing in the second direction, and the protective sheet includes a first region bonded to the sensor base material and overlapping the sensor sheet when viewed in the second direction, and a second region coupled to the installation surface and positioned outside an edge part of the sensor sheet when viewed in the second direction.

2. The force distribution sensor according to claim 1, wherein the sensor layer is entirely provided on the sensor base material.

3. The force distribution sensor according to claim 1, wherein the sensor layer is provided only at a central part of the sensor base material.

4. The force distribution sensor according to claim 1, further comprising a support substrate disposed in the second direction relative to the first substrate, wherein a surface of the support substrate in the first direction is the installation surface.

5. The force distribution sensor according to claim 1, wherein the protective sheet is provided with an opening part, when viewed in the second direction, the opening part overlaps a detection region capable of detecting force, and part of the sensor sheet is exposed through the opening part.

6. The force distribution sensor according to claim 1, wherein a recessed part in which the first substrate and the sensor sheet are housed is formed at the installation surface.

7. The force distribution sensor according to claim 1, wherein a spacer in a frame shape is interposed between the protective sheet and the installation surface, and the first substrate and the sensor sheet are housed inside the spacer.

8. The force distribution sensor according to claim 1, wherein the installation surface has a cylindrical shape.

9. The force distribution sensor according to claim 8, wherein the first substrate, the sensor sheet, and the protective sheet have a circular arc shape in a circumferential direction along the installation surface, an axial direction is a direction parallel to a central axis of the cylindrical shape, both end parts of the protective sheet in the axial direction are bonded to the installation surface, one end part of the protective sheet in the circumferential direction is bonded to the installation surface, and another end part of the protective sheet in the circumferential direction is bonded in the second direction to the one end part of the protective sheet in the circumferential direction.

10. The force distribution sensor according to claim 8, wherein the first substrate, the sensor sheet, and the protective sheet have a circular arc shape in a circumferential direction along the installation surface, an axial direction is a direction parallel to a central axis of the cylindrical shape, and both end parts of the protective sheet in the axial direction and both end parts of the protective sheet in the circumferential direction are bonded to the installation surface through a spacer.

11. The force distribution sensor according to claim 8, wherein the first substrate, the sensor sheet, and the protective sheet have a circular arc shape in a circumferential direction along the installation surface, and another end part of the protective sheet in the circumferential direction is bonded in the second direction to one end part of the protective sheet in the circumferential direction through a spacer.

12. A force distribution sensor comprising:

an first substrate and a sensor sheet that are stacked in order on a predetermined installation surface; and a fixation component fixed to the installation surface, wherein the first substrate includes a first surface on which the sensor sheet is disposed and that faces in a first direction, and a plurality of electrodes provided on the first surface, the sensor sheet includes a sensor base material having a second surface facing in a second direction opposite the first direction, and a sensor layer provided on the second surface and facing the electrodes, the sensor sheet includes an overlapping region overlapping the first substrate when viewed in the second direction, and an outside region positioned outside an edge part of the first substrate when viewed in the second direction, and the fixation component detachably fixes the outside region.

13. A force distribution sensor comprising:

an first substrate and a sensor sheet that are stacked in order on a predetermined installation surface; and a detachable component detachably attached to the installation surface, wherein the first substrate includes a first surface on which the sensor sheet is disposed and that faces in a first direction, and a plurality of electrodes provided on the first surface, the sensor sheet includes a sensor base material having a second surface facing in a second direction opposite the first direction, and a sensor layer provided on the second surface and facing the electrodes, the sensor sheet includes an overlapping region overlapping the first substrate when viewed in the second direction, and an outside region positioned outside an edge part of the first substrate when viewed in the second direction, and the detachable component detachably attached to the installation surface supports the outside region.

* * * * *